(12) United States Patent
Amano et al.

(10) Patent No.: US 7,965,587 B2
(45) Date of Patent: Jun. 21, 2011

(54) RECORD REPRODUCING SYSTEM, RECORD REPRODUCING METHOD AND RECORD REPRODUCING PROGRAM

(75) Inventors: Katsumi Amano, Saitama (JP); Shisei Cho, Saitama (JP)

(73) Assignee: Pioneer Corporation, Tokyo (JP)

( * ) Notice: Subject to any disclaimer, the term of this patent is extended or adjusted under 35 U.S.C. 154(b) by 1289 days.

(21) Appl. No.: 11/547,958

(22) PCT Filed: Apr. 5, 2005

(86) PCT No.: PCT/JP2005/006652
§ 371 (c)(1),
(2), (4) Date: Oct. 10, 2006

(87) PCT Pub. No.: WO2005/098853
PCT Pub. Date: Oct. 20, 2005

(65) Prior Publication Data
US 2007/0217304 A1    Sep. 20, 2007

(30) Foreign Application Priority Data
Apr. 9, 2004   (JP) ................. 2004-116110

(51) Int. Cl.
*G11B 21/08*    (2006.01)
(52) U.S. Cl. ............... 369/30.18; 369/53.31; 386/46

(58) Field of Classification Search ............... 369/24.01, 369/93; 386/46
See application file for complete search history.

(56) References Cited

U.S. PATENT DOCUMENTS

| 6,553,177 | B1 * | 4/2003 | Shimizu et al. | 386/68 |
| 6,643,449 | B1 | 11/2003 | Nagata et al. | |
| 2003/0072556 | A1 * | 4/2003 | Okujima et al. | 386/46 |
| 2004/0047612 | A1 | 3/2004 | Nagata et al. | |
| 2004/0228611 | A1 * | 11/2004 | Kokado | 386/46 |

FOREIGN PATENT DOCUMENTS

| JP | 8-63897 A | 3/1996 |
| JP | 9-147532 A | 6/1997 |
| JP | 11-273246 A | 10/1999 |
| JP | 2000-350130 A | 12/2000 |
| JP | 2001-111943 A | 4/2001 |
| JP | 2002-165189 A | 6/2002 |
| JP | 2003-22606 A | 1/2003 |

* cited by examiner

*Primary Examiner* — Tan X Dinh
*Assistant Examiner* — Andrew J Sasinowski
(74) *Attorney, Agent, or Firm* — Foley & Lardner LLP

(57) ABSTRACT

A recording and reproduction system includes a recording system and a reproduction system. The reproduction system reproduces (simultaneous reproduction) data of content while the data is being recorded by the recording system. The recording system records information on recording process to a management area as management data. The reproduction system reads the management data to control reproduction.

12 Claims, 19 Drawing Sheets

| AREA A | AREA B | AREA C | AREA D | AREA E | AREA F |
|---|---|---|---|---|---|
| STATUS INFORMATION | SIMULTANEOUS ACCESS CONTROL FLAG | AVERAGE RECORDING INSTRUCTION BYTE QUANTITY PER UNIT TIME | AVERAGE RECORDING TIME REQUIRED FOR RECORDING ONE BYTE | TEMPORARY DATA OF AREA C | TEMPORARY DATA OF AREA D |
| RECORDING | ON | c | d | e | f |

US 7,965,587 B2

RECORD REPRODUCING SYSTEM, RECORD REPRODUCING METHOD AND RECORD REPRODUCING PROGRAM

TECHNICAL FIELD

The present invention relates to a recording and reproduction system, a recording and reproduction method, and a recording and reproduction program. However, application of the present invention is not limited to the recording and reproduction system, the recording and reproduction method, and the recording and reproduction program.

BACKGROUND ART

Conventionally, a recording device and a reproduction device including an area in which management information of main data is recorded, and corresponding to a recording medium in which the management information is updated according to a recording operation, after completion of the recording operation have been known. The recording medium and the reproduction device are configured to serve as the recording device and when the main data is recorded, the reproduction device can record information related to the main data, serving as subcode data, in the recording medium. Information related to information to be presented in the management information is recorded as the subcode data such that the management information can be updated based on the subcode. Alternatively, data not directly related to the management data is recorded. The reproduction device decodes the subcode data when reproducing the main data, and outputs a content of the subcode data by, for example, displaying the content (for example, refer to Patent Document 1).

In addition, a disk recording device that allows recording of track information at an arbitrary timing, even for tracks of which recording process is incomplete is known. In the disk recording device, text information attached to a predetermined track number in a disk in the disk recording device is recorded in a memory. When recording performed in a program area of the disk is completed, whether recording of a track having the track number corresponding to the input text information is completed is judged based on a predetermined instruction signal. If the recording is completed, the text information is recorded in association with the track number. If the recording of the track having the track number corresponding to the input text information is not completed, information related to the text information stored in the memory is abandoned (for example, refer to Patent Document 2).

Furthermore, a recording and reproduction device and method, a recording medium, and a program capable of outputting monitor audio at a normal speed, in high-speed recording mode are known. In this conventional technology, at step S321, a CD RIPPING judges whether a high-speed recording flag is ON. At step S322, the CD RIPPING judges whether a recording process for one song is completed. AT step S323, the CD RIPPING starts a writing process of PCM data buffered by a PCM data reading buffer, in a link buffer. When a recording area of the link buffer is insufficient, in the normal recording mode, the PCM data reading buffer buffers the PCM data after waiting until the recording area becomes sufficient. In the high-speed recording mode, the buffering of the PCM data is terminated. At step S323, the CD RIPPING starts a reading process of the PCM data recorded in the link buffer without waiting for completion of the process at step S323 (for example, refer to Patent Document 3).

Patent Document 1: Japanese Patent Laid-open Publication No. H8-063897
Patent Document 2: Japanese Patent Laid-open Publication No. H9-147532
Patent Document 3: Japanese Patent Laid-open Publication No. 2003-022606

DISCLOSURE OF INVENTION

Problem to be Solved by the Invention

However, in conventional technologies in the Patent references 1 to 3, a recording device does not provide a status of the recording device to a reproduction device. In other words, judgment on whether the recording device is recording is performed by judging whether data size is increasing when viewed from a time axis. Therefore, to confirm whether the data size is increasing, it is required to wait for a certain amount of time, and therefore, a problem can be given as an example, in that it takes time to judge whether the recording device is recording.

In addition, when a content that is currently being recorded is to be reproduced, in case of designating a reproduction position, whether the reproduction position can be moved to a target reproduction position cannot be judged. A problem can be given as an example, in that even if the reproduction position can be moved to the reproduction position, it is unclear when the reproduction starts.

Furthermore, when data that is currently being recorded is to be reproduced, in case that it is unclear when the content being recorded ends, whether the designated reproduction position is the end of the content cannot be judged, and therefore, a problem can be given as an example, in that reproduction is forcibly terminated at the moment the end position of the content is reached.

Means for Solving Problem

A recording and reproduction system according to claim 1 includes a recording device and a reproduction device. The recording device includes a recording unit that records content related to images or audio; and a generating unit that generates information related to a recording process of the recording unit. The reproduction device includes a reproducing unit that reproduces the content; and a reproduction control unit that controls the reproducing unit and reproduces the content based on the information related to the recording process, generated by the generating unit, when the recording unit is recording the content. The reproduction control unit includes an inputting unit that receives an input of a reproduction position of the content; a position judging unit that judges whether the reproduction position input by the inputting unit is within a recording segment, from a head recording position to an end recording position of the content; a status judging unit that judges whether the content is being recorded based on the information related to the recording process, generated by the generating unit, when the position judging unit judges that the reproduction position is not within the recording segment; and a detecting unit that detects whether the end recording position has passed the reproduction position by moving according to an elapse of a recording time, when the status judging unit judges that the content is being recorded. The reproducing unit reproduces the content being recorded from the reproduction position, based on a detection result detected by the detecting unit.

Moreover, a recording and reproduction system according to claim 11 includes a recording device that records content related to images or audio and a reproduction device that reproduces the content. The reproduction device includes an inputting unit that, while the recording device is recording the content, receives an input of a reproduction position of the content being recorded, a position judging unit that judges whether the reproduction position input by the inputting device is within a recording segment between a head recording position being recorded to the end recording position of the content, a detecting unit that detects whether the end recording position has passed the reproduction position by moving according to an elapse of a recording time, when the position judging unit judges that the reproduction position is not within the recording segment, and a reproducing unit that reproduces the content being recorded based on a detection result detected by the detecting unit.

Furthermore, a recording and reproduction method according to claim 12 is a recording and reproduction method in which, while recording content related to images or audio, the content being recorded is reproduced, and includes an inputting step of inputting a reproduction position of the content being recorded; a position judging step of judging whether the reproduction position input by the inputting unit is within a recording segment, from a recording start position to a recording end position of the content; a detecting step of detecting whether the end recording position has passed the reproduction position by moving according to an elapse of a recording time, when the reproduction position is judged not to be within the recording segment at the position judging step; and a reproducing step of reproducing the content being recorded from the reproduction position, when the recording end position is detected to have passed the reproduction position at the detecting step.

Moreover, a recording and reproduction method according to one aspect of the embodiment including a generating step of generating information related to a recording status of content related to images or audio; an inputting step of inputting a reproduction position of the content; a position judging step of judging whether the reproduction position input by the inputting unit is within a recording segment, from a head recording position to an end recording position of the content; a status judging step of judging whether the content is being recorded based on the information related to the recording status, generated by the generating unit, when the position judging unit judges that the reproduction position is not within the recording segment; a detecting step of detecting whether the end recording position has passed the reproduction position by moving according to an elapse of a recording time, when the status judging unit judges that the content is being recorded; and a reproducing step of reproducing the content being recorded from the reproduction position based on a detection result of detection at the detecting step.

Furthermore, a recording and reproduction program makes a computer execute the recording and reproduction method according to one aspect of the embodiment.

BRIEF DESCRIPTION OF DRAWINGS

FIG. 10 is a diagram for explaining a management area of a recording medium according to a second example;

EXPLANATIONS OF LETTERS OR NUMERALS

Figure 1:
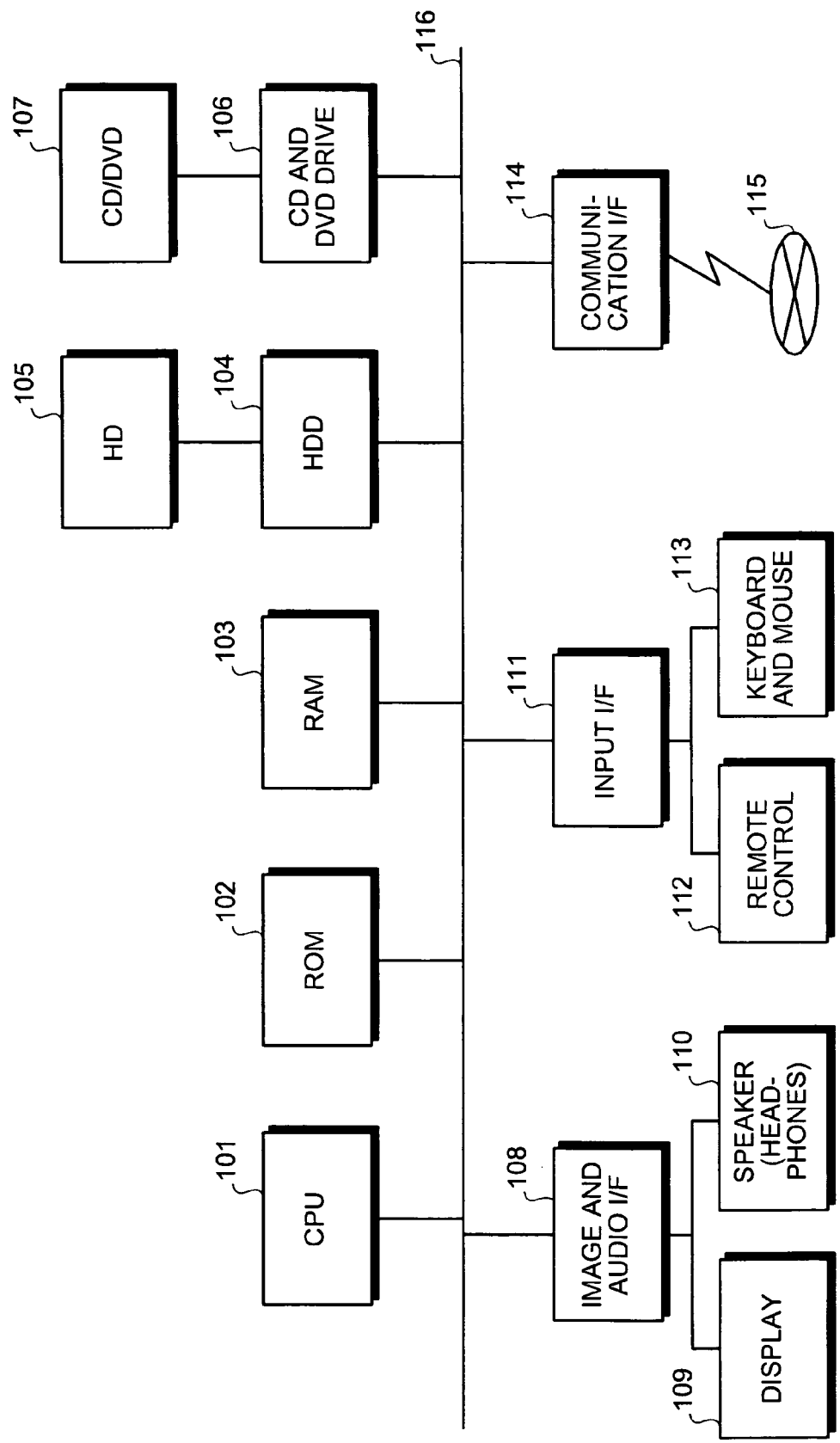
FIG. 1 is a block diagram of a hardware configuration of a recording and reproduction system according to an embodiment of the present invention.

200 Recording and reproduction system
201 Recording device
202 Reproduction device
203 Content
204 Status information
205 Memory unit
206 First memory area
207 Second memory area
211 Recording unit
212 Generating unit
213 Recording-speed-information calculating unit
214 First updating unit
215 Second updating unit
220 Reproduction control unit
221 Reproduction position input unit
222 Position judging unit
223 Status judging unit
224 Detecting unit
225 Change-instruction-information input unit
226 Determining unit
227 Changing unit
230 Reproducing unit
240 Estimated waiting time calculating unit
241 Comparing unit
242 Calculation processing unit
243 Estimated recording speed calculating unit

BEST MODE(S) FOR CARRYING OUT THE INVENTION

Exemplary embodiments of a recording and reproduction system, a recording and reproduction method, and a recording and reproduction program according to the present invention are explained in detail below with reference to the accompanying drawings. The recording and reproduction system includes a recording device, a reproduction device, and a recording medium. The recording device records content in the recording medium. The reproduction device reproduces the content. The content is recorded in the recording medium. Here, the content is electronic data related to images or audio. Examples of the content are commercial image content, image information, image content in joint photographic experts group (JPG) format, bit-map (BMP) format, and the like, an image display of componental analysis data content, music information expressing music, and other audio information. The commercial image contents include movies, live music clips, documentaries, and the like. The image information includes images of recorded television programs, images filmed by a video camera, and the like. Other audio information includes conversation contents, sound effects, and the like.

(Hardware Configuration of Recording and Reproduction System)

First, a hardware configuration of the recording and reproduction system according to the present embodiment will be explained. FIG. 1 is a block diagram of the hardware configuration of the recording and reproduction system according to the embodiment. The recording and reproduction system includes a CPU 101, a ROM 102, a RAM 103, an HDD (hard disk drive) 104, an HD (hard disk) 105, a CD/DVD drive 106, CD/DVD 107 as an example of a removable recording medium, an image/audio I/F (interface) 108, a display 109, a speaker 110, an input I/F (interface) 111, a remote control 112, a keyboard/mouse 113, and a communication I/F (interface) 114. Components 101 to 114 are respectively connected by a bus 116.

The CPU 101 controls the overall recording and reproduction system. The ROM 102 stores programs, such as a boot program. The RAM 103 is used as a work area of the CPU 101. The HDD 104 controls reading and writing of data from and to the HD 105, under the control of the CPU 101. The HD 105 stores the data written under the control of the HDD 104.

The CD/DVD drive 106 controls reading/writing of data from/to the CD/DVD 107, under the control of the CPU 101. The CD/DVD 107 is the removable recording medium from which data recorded therein under the control of the CD/DVD drive 106 is read out. A writable recording medium can also be used as the CD/DVD 107. Aside from the CD/DVD 107, a CD-ROM (CD-R and CD-RW), an MO disk, a memory card, and the like can be used as the removable recording medium.

The image/audio I/F (interface) 108 is connected to the display 109 used for image display and the speaker 110 (or headphones) used for audio output. The display 109 displays various data, such as characters and images, in addition to a cursor, icons, menus, windows, and toolboxes. The display 109 can be, for example, a CRT, a TFT liquid crystal display, or a plasma display. The speaker 110 outputs audio.

The input I/F 111 inputs data transmitted from the remote control 112 and the keyboard/mouse 113. The remote control 112 includes a plurality of keys used to input characters, numbers, various instructions, and the like. The keyboard/mouse 113 includes keys used to input characters, numbers, various instructions, and the like. The keyboard/mouse 113 also includes a keyboard that performs data input and a mouse that moves the cursor, selects a range, moves windows, moves the windows, changes window sizes, and the like. The keyboard 113 can be a touch-panel-type input pad, a numeric keypad, or the like. The mouse 113 can be a track ball, a joystick, or the like, that similarly functions as a pointing device. In addition, although an output I/F is not shown in the diagram, the recording and reproduction system can include the output I/F. A scanner and a printer can be connected via the output I/F. The scanner optically reads characters and images. The printer prints out the characters and images.

The communication I/F 114 is connected to a network 115, such as the internet, wirelessly or via a communication circuit. The communication I/F 114 is connected to other devices via the network 115. The communication I/F 114 controls an interface between the network 115 and the CPU 101 and controls input and output of data to and from an external device. The network 115 is a local area network (LAN), a wide area network (WAN), a public line, a wireless network, or the like.

The hardware configuration of the overall recording and reproduction device is explained in FIG. 1, and the recording and reproduction device is constituted of the recording device and the reproduction device. Therefore, the hardware configuration shown in FIG. 1 can be applied to a hardware configuration of an individual recording device and reproduction device. Furthermore, the recording medium can include the removable recording medium, such as the ROM 102, the RAM 103, the HD 105, or the CD/DVD 107, described above. The recording medium can also include the HDD 104 and the HD 105, or can include the CD/DVD 107 and the CD/DVD drive 106.

First Embodiment

Figure 2:
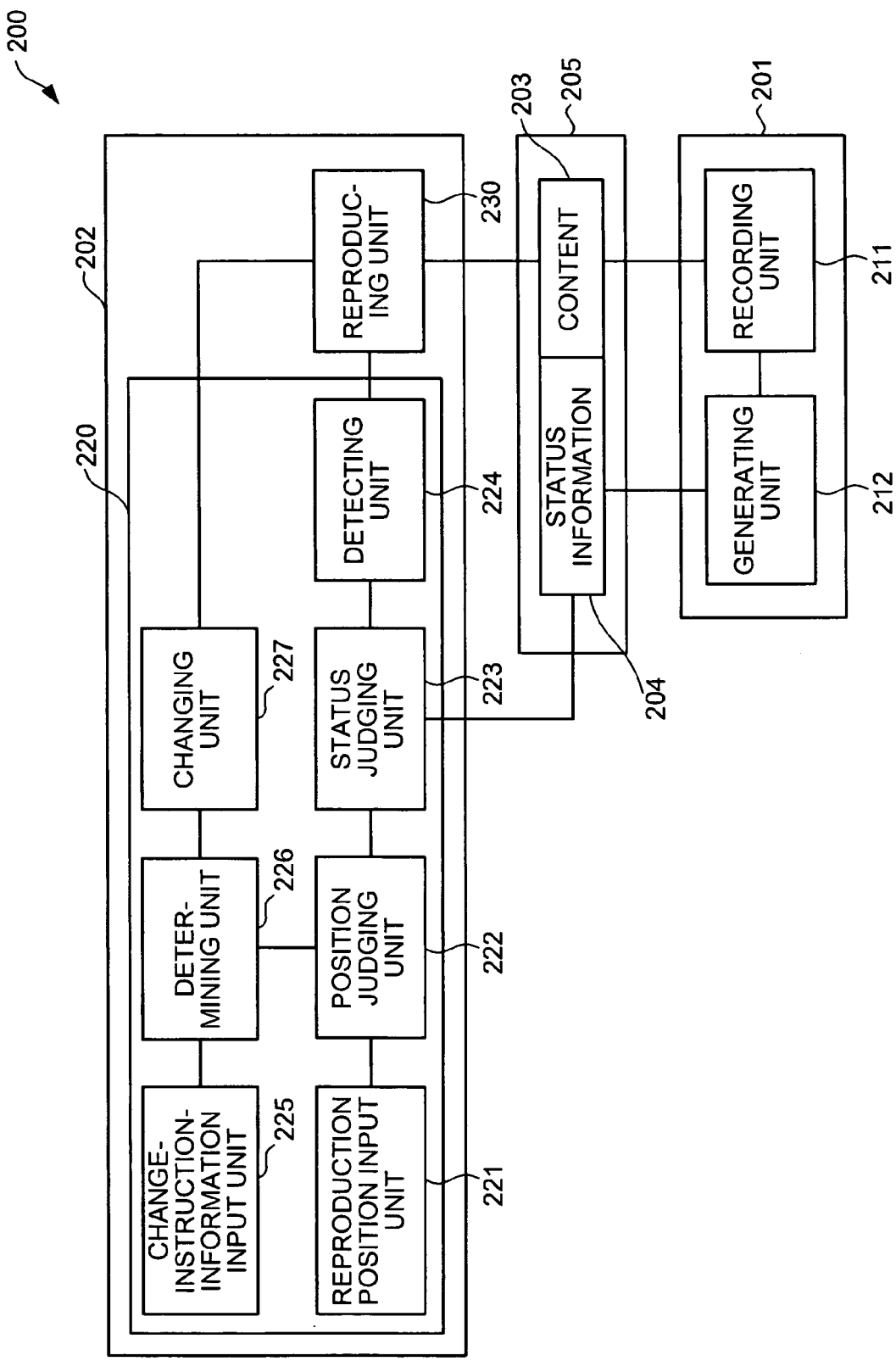
FIG. 2 is a block diagram of a functional configuration of a recording and reproduction system according to a first embodiment of the present invention.

Next, a functional configuration of the recording and reproduction system according a first embodiment of the invention will be described. FIG. 2 is a block diagram of the functional configuration of the recording and reproduction system according to the first embodiment of the invention. In FIG. 2, a recording and reproduction system 200 includes a recording device 201 and a reproduction device 202. The recording device 201 and the reproduction device 202 share a memory unit 205 that records content 203 and recording process information (status information 204 is given as an example in FIG. 2). Specifically, the memory unit 205 actualizes functions thereof by recording mediums, such as the ROM 102, the RAM 103, the HD 105, and the CD/DVD 107, shown in FIG. 1.

The recording device 201 includes a recording unit 211 and a generating unit 212. The recording unit 211 records contents in the recording device 201. Specifically, the recording unit 211 writes the content 203 to the recording medium, such as the HD 105 or the CD/DVD 107, under the control of the CPU 101, shown in FIG. 1. The generating unit 212 generates the recording process information of the recording device 201. Specifically, the recording process information is whether the content 203 is recorded in the recording device 201 (recording unit 211). More specifically, the recording process information can be the status information 204 of the content 203, such as "before recording", "recording", and "recorded".

The reproduction device 202 includes a reproduction control unit 220 and a reproducing unit 230. The reproduction control unit 220 includes a Reproduction position input unit 221, a position judging unit 222, a status judging unit 223, and a detecting unit 224. The Reproduction position input unit 221 receives an input of a reproduction position of the content 203 by an operation of the remote control 112, the keyboard/mouse 113, or other input keys. The remote control 112 and the keyboard/mouse 113 are shown in FIG. 1. The other input keys are not shown. While the content 203 is being recorded by the recording device 201, the Reproduction position input unit 221 can receive the input of the reproduction position of the content 203 being recorded.

The position judging unit 222 judges whether the reproduction position input by the Reproduction position input unit 221 is within a recording segment, from a head recording position to an end recording position of the content 203. There is no recording end position when the content 203 is "before recording". When the content 203 is "recording", the recording end position is a current recording position. When the content 203 is "recorded", the recording end position is a position at which reproduction is completed.

When the reproduction device 202 acknowledges that the status information 204 stored in the memory unit 205 is "recording", the position judging unit 222 judges whether the input reproduction position is within a recording segment, from the head recording position to the current recording position. The current recording position is the end recording position. Instances of when the status information 204 is "before recording" or "recorded" are not important to the embodiment. Therefore, explanations thereof are omitted.

When the position judging unit 222 judges that the reproduction position is not within the recording segment, the status judging unit 223 judges whether the content 203 is being recorded, based on the recording process information generated by the generating unit 212. Specifically, when the reproduction device 202 does not acknowledge that the status information 204 stored in the memory unit 205 is "recording", the status judging unit 223 judges whether the content 203 is being recorded, based on the status information 204. For example, the status information 204 can be considered to be two statuses, "before recording" or "recording", when the reproduction position is outside of the recording segment. Therefore, the status judging unit 223 can judge whether the content 203 is being recorded by referencing the status information 204.

When the position judging unit 222 judges that the reproduction position is not within the recording segment, the detecting unit 224 detects whether the end recording position has passed the reproduction position by moving according to an elapse of a recording time. Specifically, when the reproduction device 202 acknowledges that the status information 204 stored in the memory unit 205 is "recording", and particularly when the status judging unit 223 judges that the status information 204 is "recording", the reproduction position that has not yet been recorded is specified. Therefore, the detecting unit 224 detects that the current recording position, which is the end recording position, has passed the reproduction position by a time course. As a result, the content 203 is recorded up to the reproduction position.

The reproducing unit 230 reproduces the content 203 being recorded from the reproduction position based on a detection result detected by the detecting unit 224. Specifically, when the detecting unit 224 detects that the current recording position, which is the end recording position, has passed the reproduction position, the reproducing unit 230 performs a reproduction of the content 203 from the reproduction position.

The reproduction control unit 220 further includes a change-instruction-information input unit 225, a determining unit 226, and a changing unit 227. The change-instruction-information input unit 225 receives an input of changing instruction information related to a reproduction position changing instruction. The changing instruction information can be information set in advance in the reproduction device 202. The changing instruction information can also be information input by an operation of an input device, such as the remote control 112, the keyboard/mouse 113, or the other input keys. The remote control 112 and the keyboard/mouse 113 are shown in FIG. 1. The other input keys are not shown.

If the changing instruction information is set in advance in the reproduction device 202, the changing instruction information can be information indicating an instruction to forcibly change the reproduction position, when the reproduction position of the content 203 being recorded is judged to be outside of the recording segment. In addition, a difference between the reproduction position and the end recording position is calculated. When a difference value is equal to or more than a predetermined value, the changing instruction information can be input as the information indicating the instruction to forcibly change the reproduction position. When the difference value is less than the predetermined value, the changing instruction information can be input as information indicating an instruction not to change the reproduction position.

Furthermore, when the changing instruction information is the information input by the input device, an input button can be displayed in the display 109, shown in FIG. 1, when the reproduction position of the content 203 being recorded is judged to be outside of the recording segment. The input button requests a changing instruction. When the input button is depressed by the input device within a predetermined amount of time, the changing instruction information can be input as the information indicating the instruction to forcibly change the reproduction position. When the input button is not depressed within the predetermined amount of time, the changing instruction information can be input as the information indicating the instruction not to change the reproduction position.

When the position judging unit 222 judges that the reproduction position is not within the recording segment, the determining unit 226 decides whether to change the reproduction position, based on the changing instruction information input by the change-instruction-information input unit 225. Specifically, as described above, when the changing instruction information is input as the information indicating the instruction to forcibly change the reproduction position, the determining unit 226 decides to change the reproduction position. At the same time, when the changing instruction information is input as the information indicating the instruction not to change the reproduction position, the determining unit 226 decides not to change the reproduction position. Furthermore, when the determining unit 226 decides not to change the reproduction position, the detecting unit 224 detects whether the end recording position has passed the reproduction position by moving according to the elapse of the recording time.

When the determining unit 226 decides to change the reproduction position, the changing unit 227 changes the reproduction position to a position within the recording segment. The changed position can be an arbitrary position. For example, the reproduction position can be changed to a current end recording position or a current head recording position. The reproducing unit 230 reproduces the content 203 being recorded from the position changed by the changing unit 227.

Specifically, functions of respective components of the recording device 201 and the reproduction device 202 can be actualized by, for example, a computer executing a program recorded in the recording medium, such as the ROM 102, the RAM 103, the HD 105, or the CD/DVD 107, shown in FIG. 1. Alternatively, the functions can be actualized by the input I/F 111.

FIRST EXAMPLE

Figure 3:
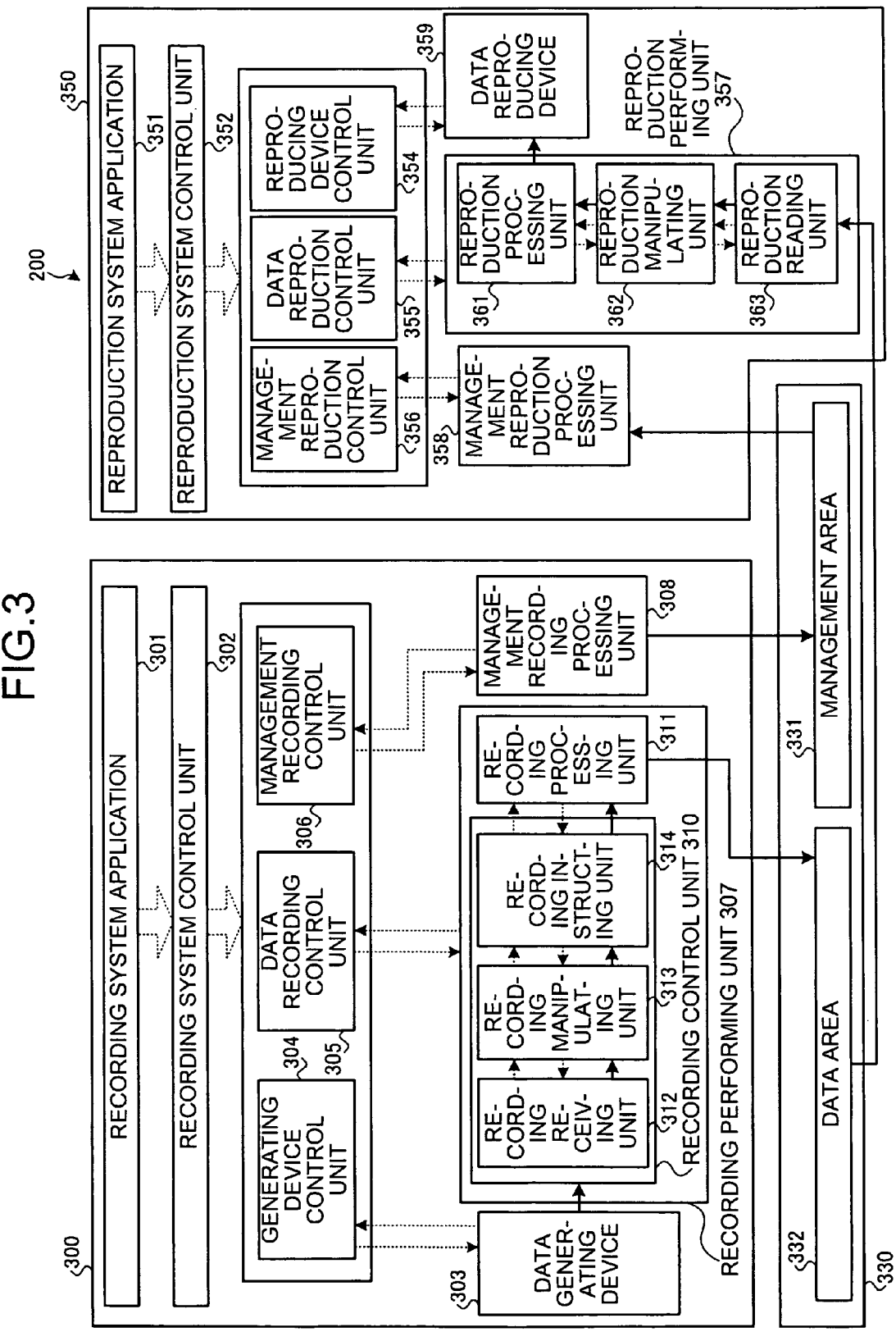
FIG. 3 is a block diagram of a system configuration of a first example of the recording and reproduction system according to the first embodiment.

Next, a system configuration of a first example of the recording and reproduction system according to a first embodiment of the invention will be explained. FIG. 3 is a block diagram of the system configuration of the first example of the recording and reproduction system according to the first embodiment. The recording and reproduction system 200 includes a recording system 300 and a reproduction system 350. The recording system 300 is equivalent to the recording device 201 shown in FIG. 2. The reproduction system 350 is equivalent to the reproduction device 202 shown in FIG. 2. In FIG. 3, a data signal is indicated by a solid line. A control signal is indicated by a dotted line. An external device is indicated by a bold line.

The recording system 300 includes a recording system application 301, a recording system control unit 302, a data generating device 303, a generating device control unit 304, a data recording control unit 305, a management recording control unit 306, a recording performing unit 307, and a management recording processing unit 308. The recording system application 301 provides instructions to the overall recording system 300. The recording system control unit 302 performs integrated control of the recording system 300. The data generating device 303 generates content 203 data, instructed by the generating device control unit 304. The generating device control unit 304 controls the data generating device 303. The data recording control unit 305 controls recording of the content 203 data. The management recording control unit 306 controls recording of management data. The recording performing unit 307 performs the recording of the management data. The management recording processing unit 308 records the management data in a recording medium 330.

The management data is an example of the above-described recording process information. Specifically, the management data can include information, such as the status information 204 of the recording device 201, a simultaneous access control flag, an average recording instruction byte quantity per unit time, and an average recording time required for recording one byte of data. The status information 204 is "before recording", "recording", "recorded", and the like. The simultaneous access control flag will be explained hereafter.

The recording performing unit 307 includes a recording control unit 310 and a recording processing unit 311. The recording control unit 310 instructs the recording processing unit 311 of the content 203 data to be recorded. The recording processing unit 311 records the content 203 data in the recording medium 330. The recording control unit 310 includes a recording receiving unit 312, a recording manipulating unit 313, and a recording instructing unit 314. The recording receiving unit 312 receives the content 203 data from the data generating device 303. The recording manipulating unit 313 manipulates the content 203 data. The recording instructing unit 314 instructs the recording processing unit 311 to record the content 203 data.

The reproduction system 350 includes a reproduction system application 351, a reproduction system control unit 352, a data reproducing device 359, a reproducing device control unit 354, a data reproduction control unit 355, a management reproduction control unit 356, a reproduction performing unit 357, and a management reproduction processing unit 358.

The reproduction system application 351 provides instructions to the overall reproduction system 350. The reproduction system control unit 352 performs integrated control of the reproduction system 350. The data reproducing device 359 reproduces the content 203 data read from the recording medium 330. The reproducing device control unit 354 controls the data reproducing device 359. The data reproduction control unit 355 controls the reproduction of the content 203 data. The management reproduction control unit 356 reads the management data. The reproduction performing unit 357 performs a reproduction operation of the content 203 data. The management reproduction processing unit 358 reads the management data.

The reproduction performing unit 357 includes a reproduction processing unit 361, a reproduction manipulating unit 362, and a reproduction reading unit 363. The reproduction processing unit 361 instructs the data reproducing device 359 of the content 203 data to be reproduced. The reproduction manipulating unit 362 manipulates the content 203 data. The reproduction reading unit 363 reads the content 203 data from a data area 332 in the recording medium 330.

The recording medium 330 is, for example, equivalent to the memory unit 205, shown in FIG. 2. The recording medium 330 includes a management area 331 and the data area 332. The management area 331 stores the management data. The data area 332 stores the content 203 data. The recording medium 330 stores a file system that detects data size of the content 203 data recorded in the data area 332. The two areas, 331 and 332, of the recording medium 330 can physically be included in the same recording medium 330 or in separate recording mediums 330. For example, the management area 331 can be in a host computer on a network, and the data area 332 can be in a local computer.

According to the system configuration, above, the reproduction system 350 can reproduce the content data 203 being recorded by the recording system 300 (hereinafter, referred to as a "simultaneous reproduction"). In other words, the recording system 300 records the recording process information in the management area 331, so that the reproduction system 350 acquires the recording process information as the management data. As a result, the reproduction system 350 can immediately control reproduction by reading the management data. Moreover, the recording system 300 and the reproduction system 350 can independently actualize respective processes, as in known systems.

In the above-described recording and reproduction system 200, the recording system 300 and the reproduction system 350 share the management data and the content 203 data that can be simultaneously reproduced. Each system operates independently. Therefore, although the reproduction system 350 is dependent on content of the management data, the reproduction system 350 is not influenced by a behavior of the recording system 300. If only the management data is shared, the recording system 300 and the reproduction system 350 are not required to physically be in a same hardware.

Similarly, a relationship between a recording speed of the recording system 300 and a reproduction speed of the reproduction system 350 is completely independent. There is no codependency in the relationship. A recording speed m is a value that is greater than zero (m>0). A reproduction speed n is a value that is not zero (n≠0). The recording speed and the reproduction speed are not codependent. However, when the reproduction speed of the reproduction device 202 exceeds the recording speed during the simultaneous reproduction, the simultaneous reproduction may be temporarily pended until the recording device 201 catches up with the reproduction device 202. However, there are no limitations to prevent the reproduction speed of the reproduction device 202 from exceeding the recording speed.

Figure 4:
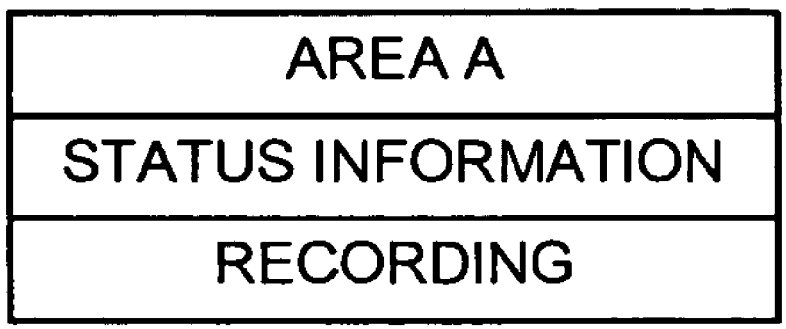
FIG. 4 is a diagram for explaining a management area of a recording medium according to the first example.

Next, the management area of the recording medium according to the first example will be explained. FIG. 4 is a diagram for explaining the management area of the recording medium. In FIG. 4, the management recording processing unit 308 of the recording system 300 records the management data in the management area 331. The management reproduction processing unit 358 of the reproduction system 350 reads the management data. In other words, the management area 331 holds the status information 204 of an area A. The recording system 300 records a recording process of the recording system 300 in the area A. A recording process status of the recording system 300 has three statuses: "before recording", "recording", and "recorded". The recording process status of the content 203 to be a recording subject sequentially advances from "before recording"→"recording"→"recorded". Subsequently, the recording processes status is reset to "before recording" when recording of another content 203 is performed.

Figure 5:
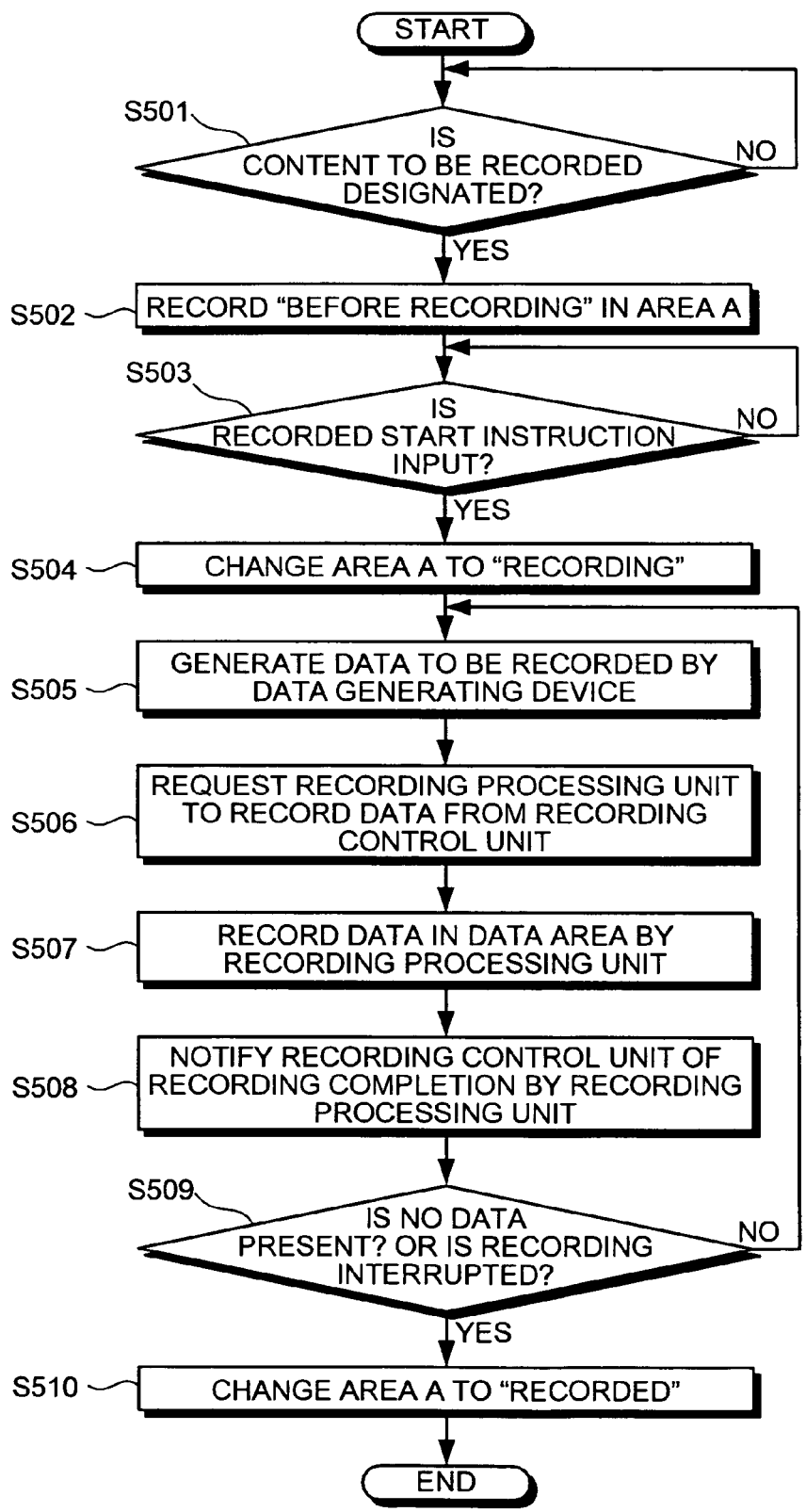
FIG. 5 is a flowchart of a recording process by a recording system of the recording and reproduction system according to the first example.

Next, the recording process of the recording system of the recording and reproduction system according to the first example will be explained. FIG. 5 is a flowchart of the recording process of the recording system of the recording and reproduction system according to the first example. First, when the content 203 to be recorded is designated (step S501: YES), "before recording" is recorded in the area A (step S502). Then, when there is an input to start recording (step S503: YES), the area A is changed from "before recording" to "recording" (step 5504).

Next, the data generating device 303 generates the content 203 data to be recorded (step S505). The recording control unit 310 consecutively receives a predetermined amount of the generated content 203 data. Then, the recording control unit 310 requests the recording processing unit 311 to record the content 203 data (step S506). The recording processing unit 311 records the content 203 data in the data area 332 of the recording medium 330 (step S507).

When the recording of the content data 203 is completed, the recording control unit 310 notifies the recording control unit 310 of the completion of the recording (step S508). Next, when the recording processing unit 311 has a next content 203 data (step S509), the process returns to step S505. At the same time, when the recording control unit 310 does not have the next content 203 data, or when the recording is interrupted (step S509: YES), the area A is changed from "recording" to "recorded" (step S510).

The processes at steps S501 to S504 and S510, among processing steps in the flowchart shown in FIG. 5, are equivalent to the processes of generating unit 212 shown in FIG. 2. The processes at steps S505 to S509 are equivalent to the processes of the recording unit 211.

Figure 6:
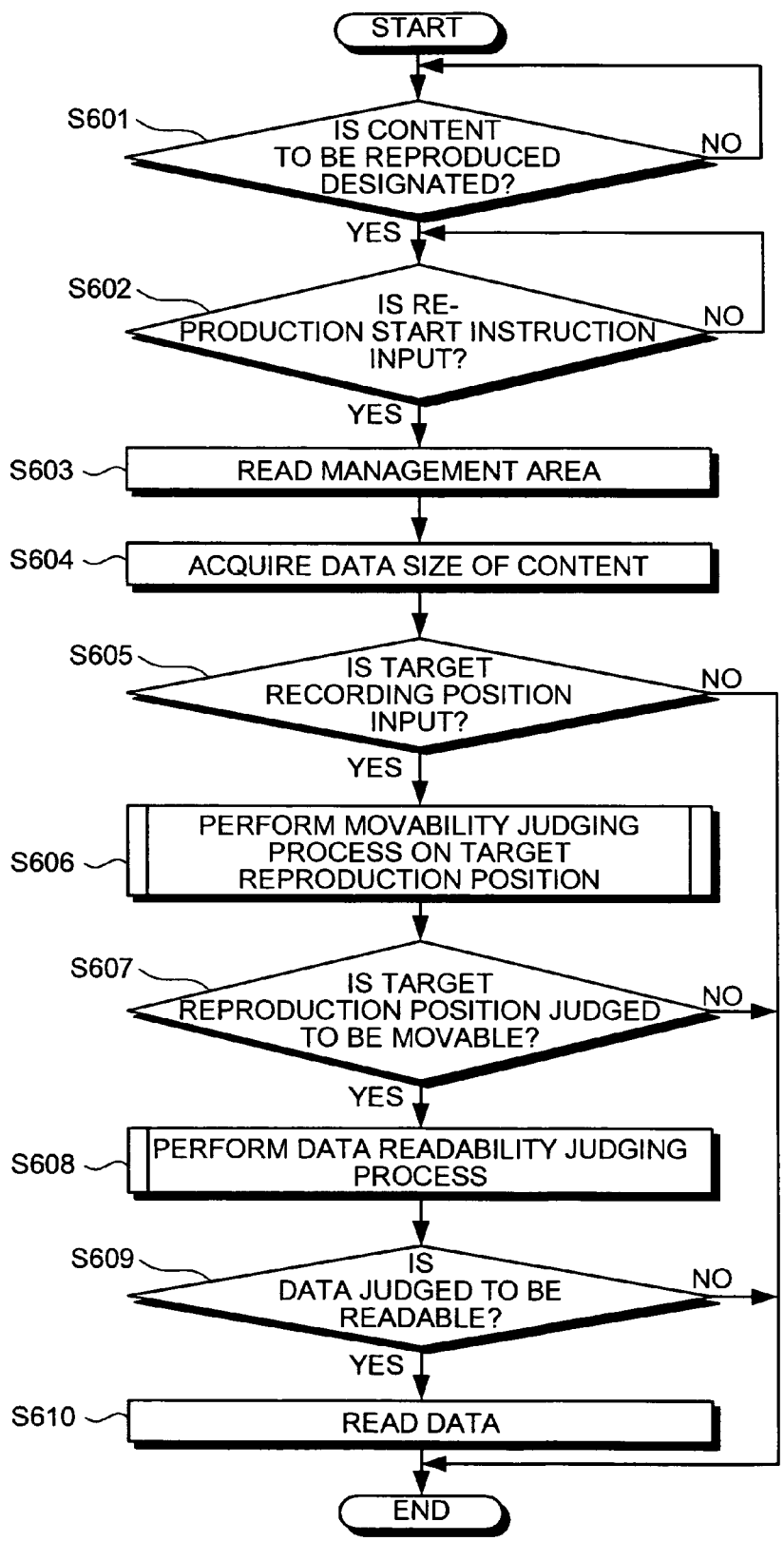
FIG. 6 is a flowchart of a reproduction process by a reproduction system according to the first example.

Next, a reproduction process of the reproduction system according to the first example will be explained. FIG. 6 is a flowchart of the reproduction process of the reproduction system according to the first example. First, when the content 203 to be reproduced is designated (step S601: YES), whether there is an input to start reproduction is judged (step S602). When there is the input to start reproduction (step S602: YES), reading of the management area 331 is performed (step S603). Then, the data size of the designated content 203 is acquired (step S604). Here, when the area A is "recorded", the acquired data size is the data size of the entire content 203. When the area A is "recording", the acquired data size is the data size from a recording start position to the current recording position.

Next, whether the reproduction position from which a user wishes to perform the reproduction of the content 203, namely, a reproduction position to be a target (hereinafter, referred to as a "target reproduction position") is input is judged (step S605). The process at step S605 is equivalent to the process of the recording position inputting unit 221 shown in FIG. 2. When the target reproduction position is input (step S605: YES), a movability judging process of the target reproduction position is performed (step S606). When the target reproduction position is judged to be movable by the movability judging process (step S607: YES), a data readability judging process of the content 203 is performed (step S608).

When the content 203 data is judged to be readable (step S609: YES), the content 203 data is read (step 610). As a result, the content 203 can be reproduced from the target reproduction position. At the same time, when the target reproduction position is not input (step S605: NO), when the target reproduction position is judged to be immovable (step S607: NO), or when the content 203 data is judged to be unreadable, the process of the reproduction system 350 is completed.

Figure 7:
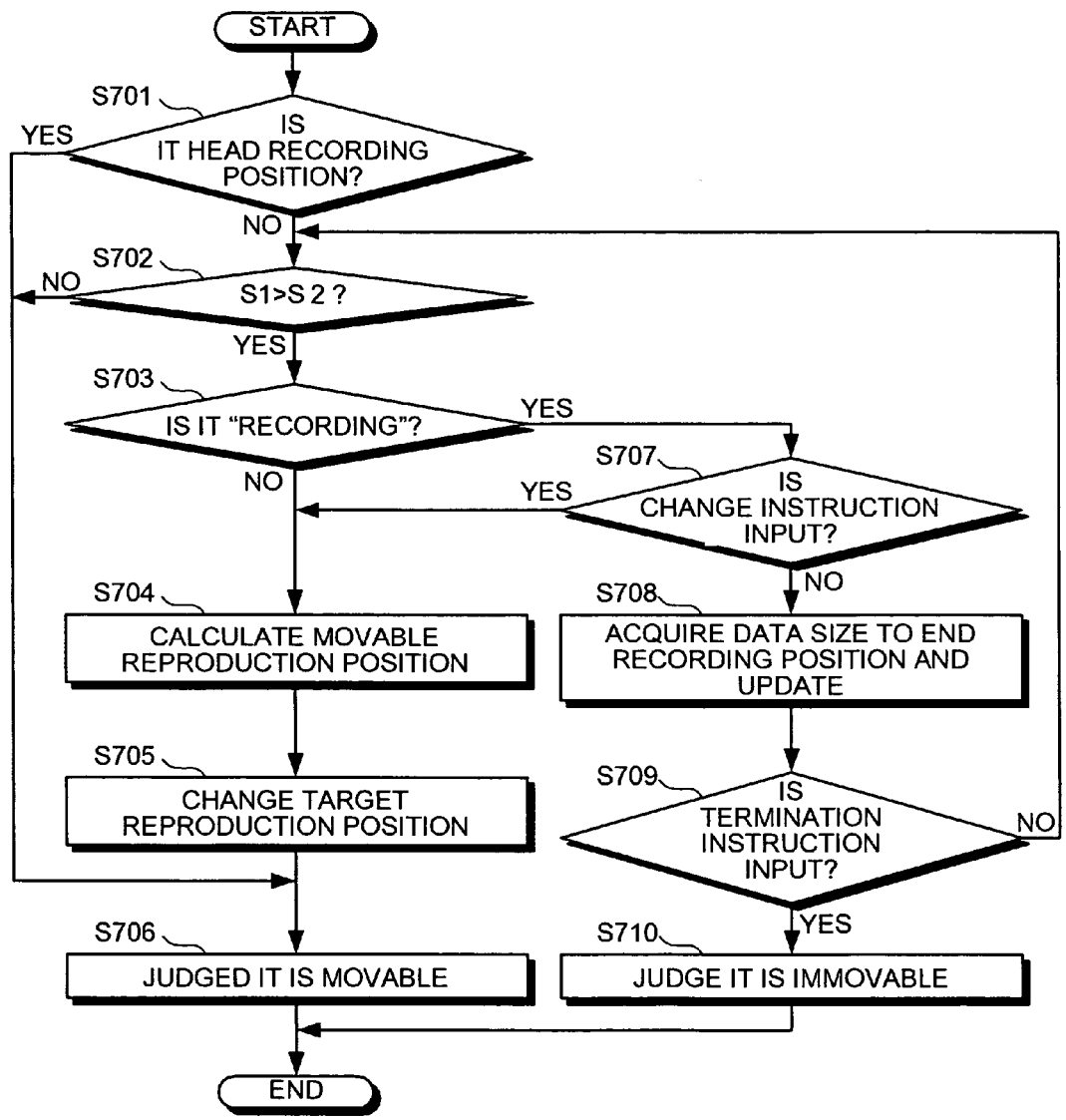
FIG. 7 is a flowchart of a movability judging process according to the first example.

Next, the movability judging process (step S606) shown in FIG. 6 will be explained. FIG. 7 is a flowchart of the movability judging process (step S606) shown in FIG. 6. First, when the target reproduction position is not the head recording position (step S701: NO), whether a data size S1 is smaller than a data size S2 is judged (step 702). The data size S1 is from the head recording position to the target reproduction position. The data size S2 is acquired at step S604 shown in FIG. 6. The process at step S702 is equivalent to the process of the position judging unit 222 shown in FIG. 2.

When the data size 1 is larger than the data size 2 (step S702: YES), whether the management area 331 (area A), read at step S603 shown in FIG. 6, is "recording" is judged (step S703). The process at step S703 is equivalent to the process of the status judging unit 223 shown in FIG. 2. When the area A is judged not to be "recording" (step S703: NO), the area A is "before recording" or "recorded". The reproduction position that is movable in a current state is calculated (step S704), and the target reproduction position is changed (step S705).

Specifically, when the area A is "before recording", the recording start position is calculated as the reproduction position that is movable in the current state, from the acquired data size S2. Then, the target reproduction position is changed to the recording start position. When the area A is "recorded", an arbitrary reproduction position is calculated as the reproduction position that is movable in the current state, from the data size S2. The arbitrary reproduction position is within a segment between the head recording position and the end recording position. The target reproduction position is changed to the calculated reproduction position. The processes at step S704 and step S705 are equivalent to the processes of the determining unit 226 and the changing unit 227 shown in FIG. 2.

Then, by the target reproduction position being changed, the target reproduction position is judged to be movable (step S706). When the target reproduction position is the head recording position (step S701: YES) or when the data size S1 is smaller than the data size S2 (step S702: NO), the target reproduction position is judged to be movable (step S706).

When the area A is judged to be "recording" at step S703 (step S703: YES), whether a changing instruction is input is judged (step S707). The process at step S707 is equivalent to the process of the change-instruction-information input unit 225 shown in FIG. 2. When the changing instruction is input (step S707: YES), the process returns to step S704. At the same time, when the changing instruction is not input (step S707: NO), the data size from the head recording position to the end recording position (the current recording position) is acquired. The data size S2 is updated to the acquired value S2' (step S708).

Next, when a reproduction termination is input (step S709: YES), the target reproduction position is judged to be movable (step S710). At the same time, when the reproduction termination is not input (step S709: NO), the process returns to step S702. The processes at steps S708 to S709 and the return to step S702 are equivalent to the processes of the detecting unit 224.

Figure 8:
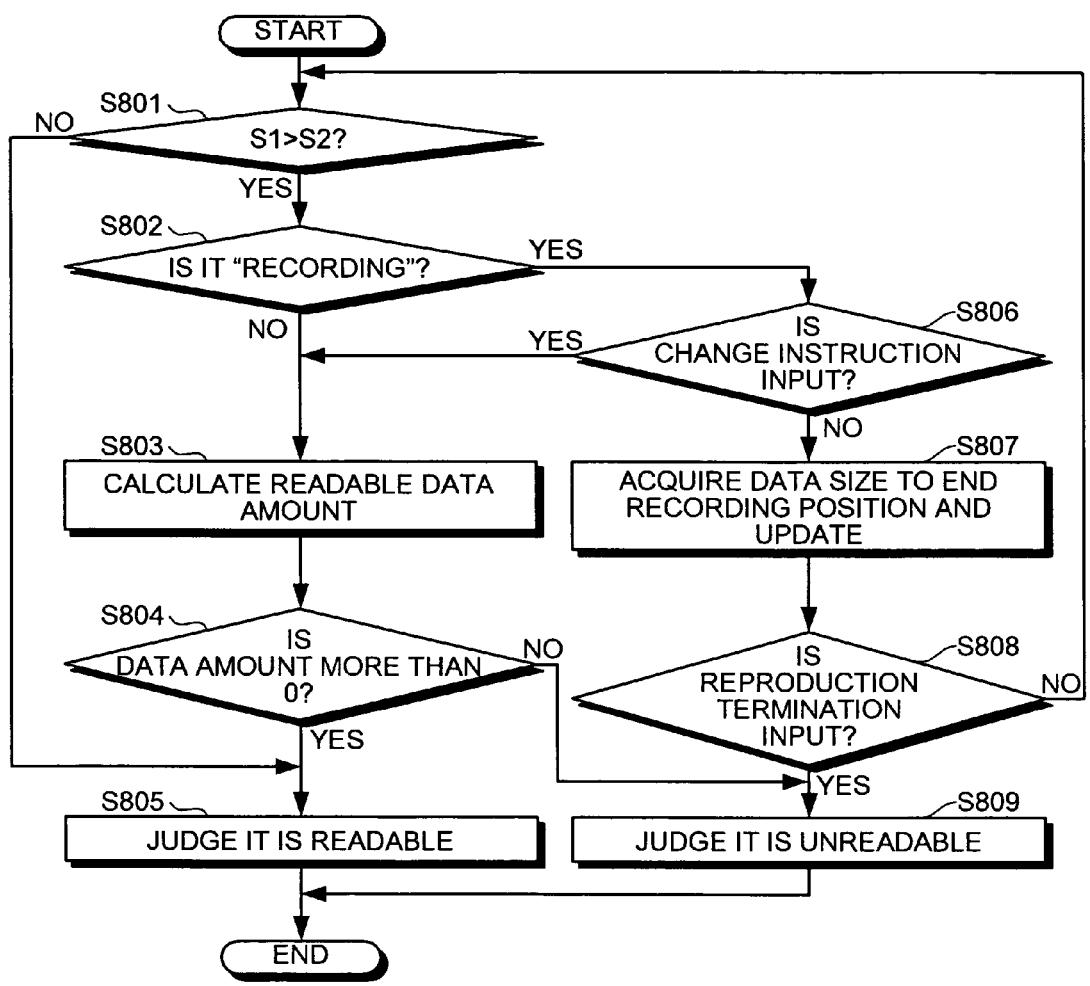
FIG. 8 is a flowchart of a data readability judging process according to the first example.

Next, the data readability judging process (step S608) shown in FIG. 6 will be explained. FIG. 8 is a flowchart of the data readability judging process (step S608) shown in FIG. 6. Here, an amount of data to be read from the "target reproduction position", judged to be movable by the "movability judging" process, is referred to as "target data amount".

First, in FIG. 8, whether the data size S1 from the head recording position to a "target reproduction position+target data amount" position is smaller than the data size acquired at step S604, shown in FIG. 6, is judged. If the data size S1 is not smaller, whether the data size S1 is smaller than the data size S2 is judged (step S801). The data size S2 is updated at step S807, described hereafter. The process at step S801 is equivalent to the process of the position judging unit 222 shown in FIG. 2.

When the data size S1 is larger than the data size S2 (step S801: YES), whether the management area 331 (area A), read at step S603 shown in FIG. 6, is "recording" is judged (step S802). The process at step S802 is equivalent to the process of the status judging unit 223 shown in FIG. 2. When the area A is judged not to be "recording" (step S802: NO), the area A is "before recording" or "recorded". The data amount of the reproduction position that is readable in the current state is calculated (step S803).

When the data amount is more than zero (step S804: YES), or when the data size S1 is smaller than the data size S2 (step S801: NO), the data is judged to be readable. At the same time, when the data amount is not more than zero (step S804: NO), the data is judged to be unreadable (step S809). The processes at step S803 and step S804 are equivalent to the processes of the determining unit 226 and the changing unit 227, shown in FIG. 2.

When the area A is judged to be "recording" at step S802 (step S802: YES), whether the changing instruction is input is judged (step S806). The process at step S806 is equivalent to the process of the change-instruction-information input unit 225 shown in FIG. 2. When the changing instruction is input (step S806: YES), the process returns to step S803.

At the same time, when the changing instruction is not input (step S806: NO), the data size from the head recording position to the end recording position (the current recording position) is acquired. The data size S2 is updated to the acquired value S2' (step S807). When the reproduction termination is input (step S808: YES), the data is judged to be unreadable (step S809). At the same time, when the reproduction termination is not input (step S808: NO), the process returns to step S801. The processes at step S807 to S808 and S801 are equivalent to the processes of the detecting unit 224 shown in FIG. 2. The processes above are repeated as required and the reproduction process is actualized.

According to the first example, the reproduction system 350 can independently recognize an operation state of the recording system 300 and perform the reproduction of the content 203 being recorded, even when recording system 300 is recording the content 203. In particular, even when a position that is not yet recorded is designated as the reproduction position, the content 203 being recorded can be reproduced from the target reproduction position by the end recording position passing the target reproduction position.

Second Embodiment

Figure 9:
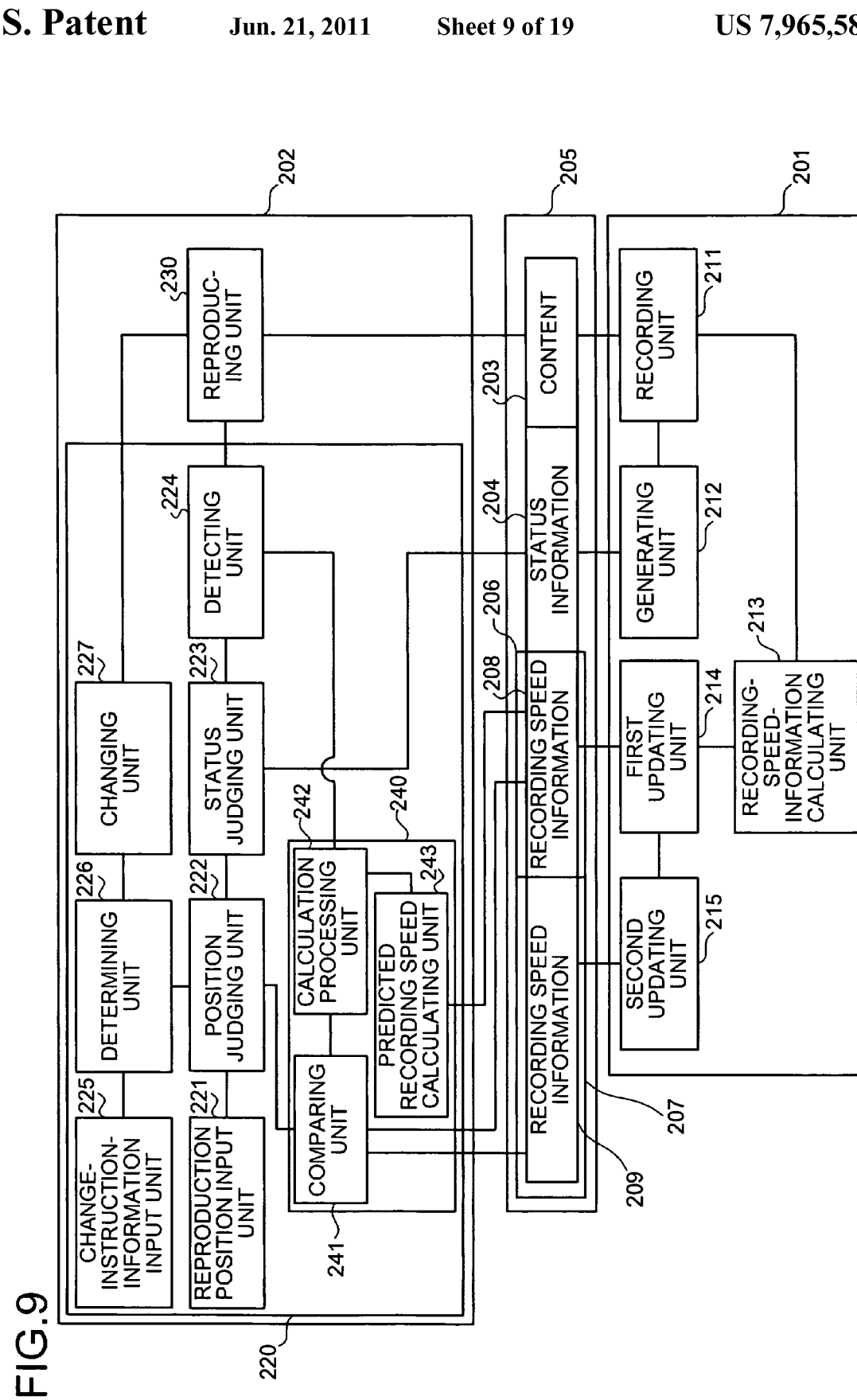
FIG. 9 is a block diagram of a functional configuration of a recording and reproduction system according to a second embodiment of the present invention.

Next, a recording and reproduction system according to a second embodiment of the invention will be explained. The recording and reproduction system is an example of an expansion of contents of the recording process information. First, a functional configuration of the recording and reproduction device according to the second embodiment of the invention will be explained. FIG. 9 is a block diagram of the functional configuration of the recording and reproduction device according to the second embodiment of the invention. A block that is the same as the block shown in FIG. 2 is given the same reference numbers, and an explanation thereof is omitted. A hardware configuration of the recording and reproduction system according to the second embodiment is also the same as the hardware configuration according to the first embodiment shown in FIG. 1, and an explanation thereof is omitted.

In FIG. 9, the recording device 201 further includes a recording-speed-information calculating unit 213, a first updating unit 214, and a second updating unit 215. The recording-speed-information calculating unit 213 calculates recording speed information of the content 203 being recorded. The recording speed information is calculated per predetermined time. As an example, the recording speed information includes a recording instruction amount per unit time of the content 203 being recorded and a recording time required per unit recording amount of the content 203 being recorded.

The memory unit 205 further stores the recording speed information calculated per predetermined time by the recording-speed-information calculating unit 213. The memory unit 205 further includes a first memory area 206 and a second memory area 207. The second memory area 207 is a different area from the first memory area 206.

Every time the recording-speed-information calculating unit 213 calculates the recording speed information, the first updating unit 214 updates a recording speed information 208 stored in the first memory area 206 to the recording speed information 208 newly calculated by the recording-speed-information calculating unit 213. Every time the first updating unit 214 performs an update, the second updating unit 215 updates a recording speed information 209 stored in the second memory area 207 to the recording speed information 209 updated by the first updating unit 214.

The reproduction control unit 220 includes an estimated waiting time calculating unit 240. When the position judging unit 222 judges that a reproduction end position ("target reproduction position+target data amount" position) is not within the recording segment, the estimated waiting time calculating unit 240 calculates an estimated waiting time from the end recording position to the reproduction end position ("target reproduction position+target data amount" position), based on the end recording position, the reproduction end position ("target reproduction position+target data amount" position), and the recording speed information calculated by the recording-speed-information calculating unit 213.

In addition, when the position judging unit 222 judges that the reproduction end position ("target reproduction position+target data amount" position) is not within the recording segment, the estimated waiting time calculating unit 240 can calculate the estimated waiting time from the end recording position to the reproduction end position ("target reproduction position+target data amount" position), based on the end recording position, the reproduction end position ("target reproduction position+target data amount" position), and the recording speed information 209 updated by the second updating unit 215.

Specifically, the estimated waiting time calculating unit 240 includes a comparing unit 241 and a calculation processing unit 242. When the position judging unit 222 judges that the reproduction end position is not within the recording segment, the comparing unit compares the recording speed information 208 and the recording speed information 209. The recording speed information 208 is updated by the first updating unit 214, and the recording speed information 209 is updated by the second updating unit 215. The calculation processing unit 242 calculates the estimated waiting time based on a result of the comparison performed by the comparing unit 214.

The estimated waiting time calculating unit 240 further includes an estimated recording speed calculating unit 243. The estimated recording speed calculating unit 243 calculates an estimated recording speed, based on the recording instruction amount per unit time of the content 203 being recorded and the recording time required per unit recording amount of the content 203 being recorded. In this case, when the position judging unit 222 judges that the reproduction end position ("target reproduction position+target data amount" position) is not within the recording segment, the calculation processing unit 242 calculates the estimated waiting time, based on the end recording position, the reproduction end position ("target reproduction position+target data amount" position), and the estimated recording speed calculated by the estimated recording speed calculating unit 243.

In the second embodiment, the detecting unit 224 detects whether the estimated waiting time calculated by the estimated waiting time calculating unit 240 has elapsed. When the determining unit 226 decides not to change the reproduction end position ("target reproduction position+target data amount" position, the detecting unit 224 detects whether the estimated waiting time calculated by the estimated waiting time calculating unit 240 has elapsed.

Specifically, the functions of respective components of the recording device 201 and the reproduction device 202, described above, are actualized by, for example, the computer executing the program recorded in the recording medium 330, such as the ROM 102, the RAM 103, the HD 105, or the CD/DVD 107, shown in FIG. 1. Alternatively, the functions can be actualized by the input I/F 111.

SECOND EXAMPLE

Next, a second example of the recording and reproduction system according to the second embodiment of the invention will be explained. First, a management area of a recording medium according to the second example will be explained. FIG. 10 is a diagram for explaining the management area of the recording medium. An explanation of content that are the same as the contents of the management area shown in FIG. 4 is omitted.

In FIG. 10, the management area 331 includes an area B to area F, in addition to the area A. The area B is equivalent to the status information 204 shown in FIG. 9. An area C and an area D are equivalent to the recording speed information 208 shown in FIG. 9. An area E and the area F are equivalent to the recording speed information 209 shown in FIG. 9.

The area B records the simultaneous access control flag. The simultaneous access control flag controls whether to enable a process that prevents an access competition of the management area 331 by the recording system 300 and the reproduction system 350. The simultaneous access control flag is expressed by "ON" and "OFF". When the simultaneous access control flag is "ON", simultaneous access is enabled. When the simultaneous access control flag is "NO", the simultaneous access is disabled. The recording system 300 decides whether to use the simultaneous access flag and sets the simultaneous access flag to either "ON" or "OFF". The reproduction system 350 complies with the setting decided by the recording system.

The area C records an average recording instruction byte quantity c per unit time (for example, one second). The average recording instruction byte quantity c can be, for example, a mean value of a number of bytes the recording control unit 310 instructs the recording processing unit 311 to record per unit time. As shown in FIG. 3, the recording control unit 310 includes the recording receiving unit 312, the recording manipulating unit 313, and the recording instructing unit 314. A value to be recorded is calculated as a total performance of the recording receiving unit 312, the recording manipulating unit 313, and the recording instructing unit 314. The value is calculated and recorded every time the value is recorded or when the calculated value differs from the content of the area C. However, when the status information of the area A is "recorded", the value is zero.

The area D records an average recording time d required for recording one byte of data. Specifically, the average recording time d is a mean value of a time required until the recording processing unit 311 completes a processing of a recording request instructed by the recording instructing unit 314. Generally, the value becomes large in an environment in which the recording instructing unit 314 and the recording processing unit 311 are separated via a network, such as on a computer network. Timing for recording the value is the same as that of the area C. When the status information of the area A is "recorded", zero is recorded as in the area C.

The area E is a temporary area of the area C. The area E records a temporary data e of the average recording instruction byte quantity c per unit time (for example, 1 second). The area F is a temporary area of the area D. The area F records a temporary data f of the average recording time d required for recording one byte of data. When the values recorded in the area C and the area D are overwritten with new values, the area E and the area F temporarily record the new values to perform overwriting with the new values.

Information e and f, recorded in the area E and the area F, are used when "ON" is recorded in the area B. The area E and the area F are temporary areas provided, taking into consideration a characteristic of the recording system 300 and the reproduction system 350, in which the recording system 300 and the reproduction system 350 simultaneously access the management area 331. When the recording system 300 updates information recorded in the area C and the area D, the recording system 300 first records new information in the area E and the area F and subsequently records the new information in a normal area C and area D. The process can prevent the reproducing unit 230 from acquiring erroneous information during recording. When an update of the values in the area C and the area D, which are main areas, is completed, the values of the area C and the area E are the same and the values of the area D and the area F are the same.

Figure 11:
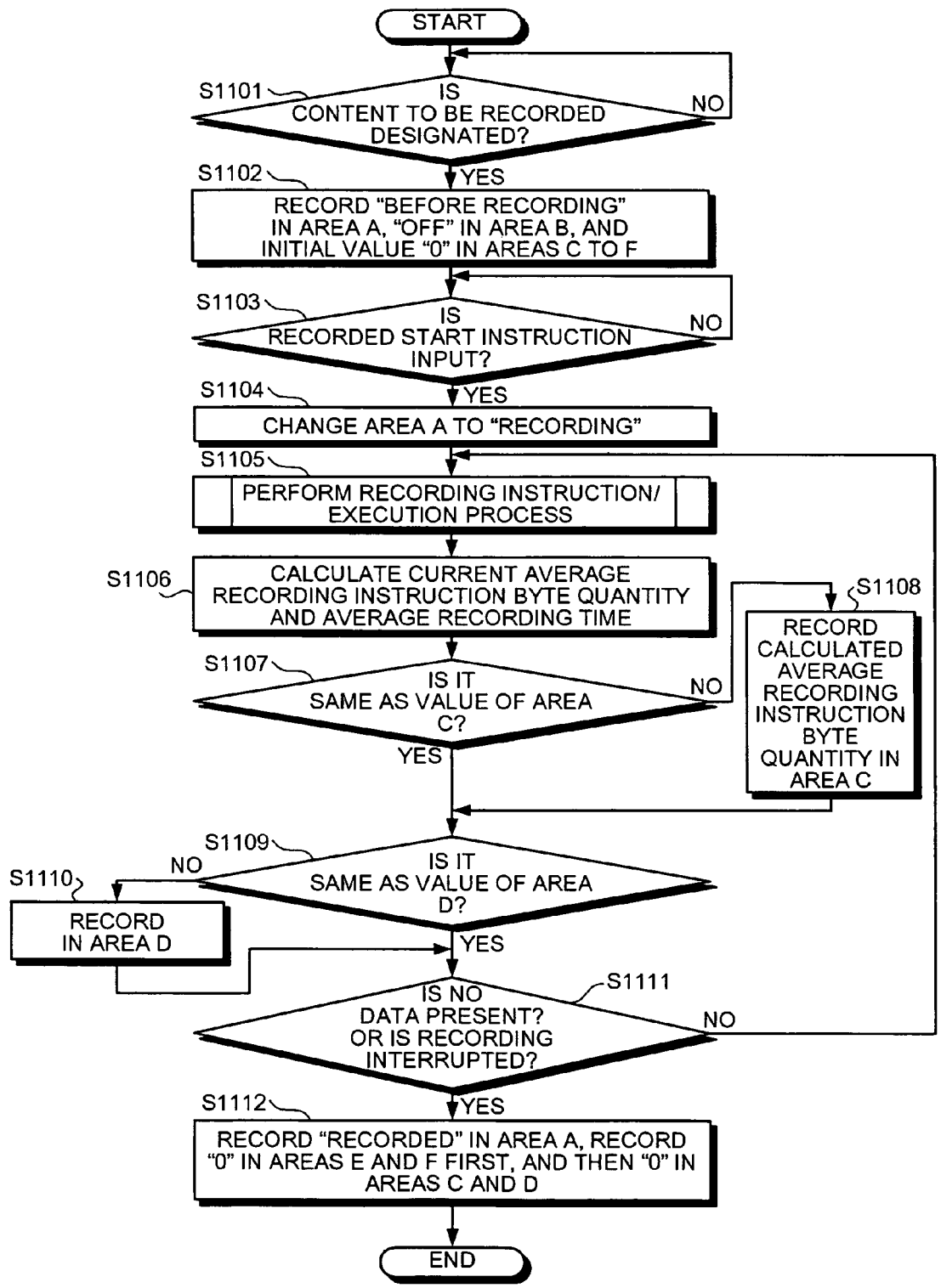
FIG. 11 is a flowchart of a recording process by a recording system of a recording and reproduction system when a simultaneous access control flag of an area B is "OFF" in the second example.

Next, a recording process of the recording system of the recording and reproduction system when the simultaneous access control flag of the area B is "OFF" in the second example will be explained. FIG. 11 is a flowchart of the recording process of the recording system of the recording and reproduction system 200 when the simultaneous access control flag of the area B is "OFF" in the second example. In FIG. 11, first, when the content 203 to be recorded is designated (step S1101: YES), "before recording" is recorded in the area A, "OFF" is recorded in the area B, and an initial value "0" is recorded in the areas C to F (step S1102).

When there is the input to start recording (step S1103: YES), the area A is changed from "before recording" to "recording" (step S1104). Next, a recording instruction and performance process is performed (step S1105). Details of the process are the same as that at steps S505 to S508 shown in FIG. 5. Then, current average recording instruction byte quantity c per unit time (for example, one second) and average recording time d required for recording one byte of data are calculated (step S1106). The process at step S1106 is equivalent to a calculation process of the recording-speed-information calculating unit 213 shown in FIG. 9.

Next, the value recorded in the area C and the calculated average recording instruction byte quantity c are compared to determine whether the values are the same (step S1107). When the values are not the same (step S1107: NO), the calculated average recording instruction byte quantity c is recorded in the area C (step S1108). At the same time, when the values are the same (step S1107: YES), the value recorded in the area D and the calculated average recording time d are compared to determine whether the values are the same (step S1109). If the values are not the same (step S1109: NO), the calculated average recording time d is stored in the area D (step S1110).

At the same time, when the values are the same (step S1109: YES) and the recording processing unit 311 has the next content 203 data (step S1111: NO), the process returns to step S1105. At the same time, when the recording processing unit 310 does not have the next content 203 data or when the recording is interrupted (step S1111: YES), the area A is changed from "recording" to "recorded", and "0" is recorded in the area E and the area F. Subsequently, "0" is recorded in the area C and the area D (step S1112).

Next, a reproduction process of the reproduction system of the recording and reproduction system when the simultaneous access control flag of the area B is "OFF" in the second example will be explained. The reproduction process of the overall reproduction system is the same as the details of the process in the flowchart shown in FIG. 6. Therefore, an explanation thereof is omitted. The movability judging process of the "target reproduction position+target data amount" position (step S606) shown in FIG. 6 will be explained.

Figure 12:
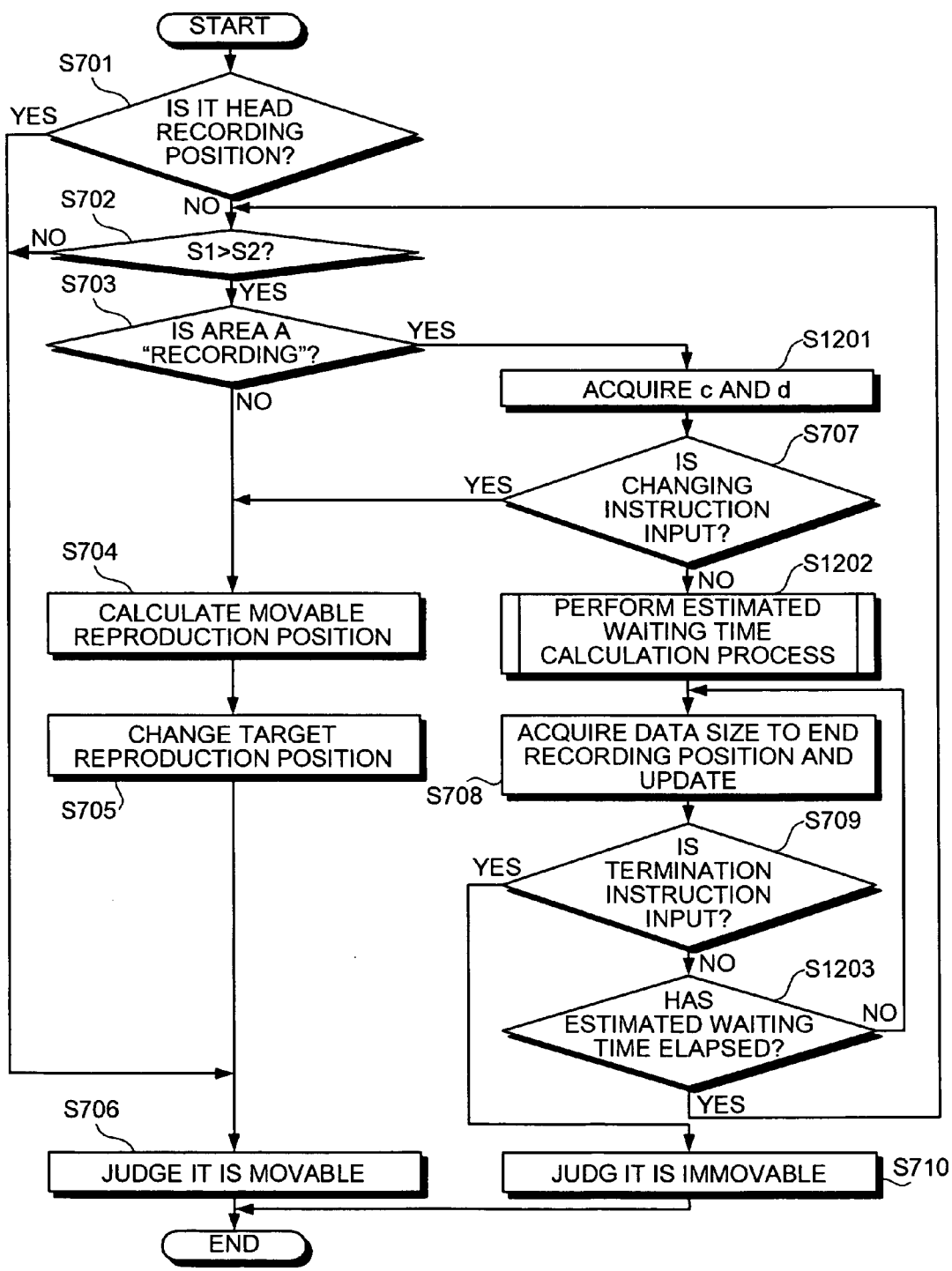
FIG. 12 is a flowchart of a movability judging process according to the second example.

FIG. 12 is a flowchart of the movability judging process (step S606) shown in FIG. 6. In the flowchart, a process of step S1201 is performed between step S703: YES and step S707. A process of step S1202 is performed between step S707: NO and step S708. A process of step S1203 is performed between step S709: NO and step S702. Explanations of steps having the same step number as those in FIG. 7 are omitted.

First, when the area A is judged to be "recording" in step 703 (step S703: YES), the current average recording instruction byte quantity c per unit time (for example, one second) is acquired from the area C and the current average recording time d for recording one byte of data is acquired from the area D of the recording medium 330 (step 1201).

Then, when the changing instruction is not input in step S707 (step S707: NO), an estimated waiting time calculation process is performed (step S1202). The estimated waiting time calculation process is equivalent to the calculation process of the estimated waiting time calculating unit 240 shown in FIG. 9. Then, after step S709: NO, whether the estimated waiting time has elapsed is detected (step S1203). When the elapse of the estimated waiting time not detected (step S1203: NO), the process returns to step S708. At the same time, when the elapse of the estimated waiting time is detected (step S1203: YES), the process returns to step 702. The estimated waiting time detection process (step S1203) is equivalent to a detection process of the detecting unit 224 shown in FIG. 9.

Figure 13:
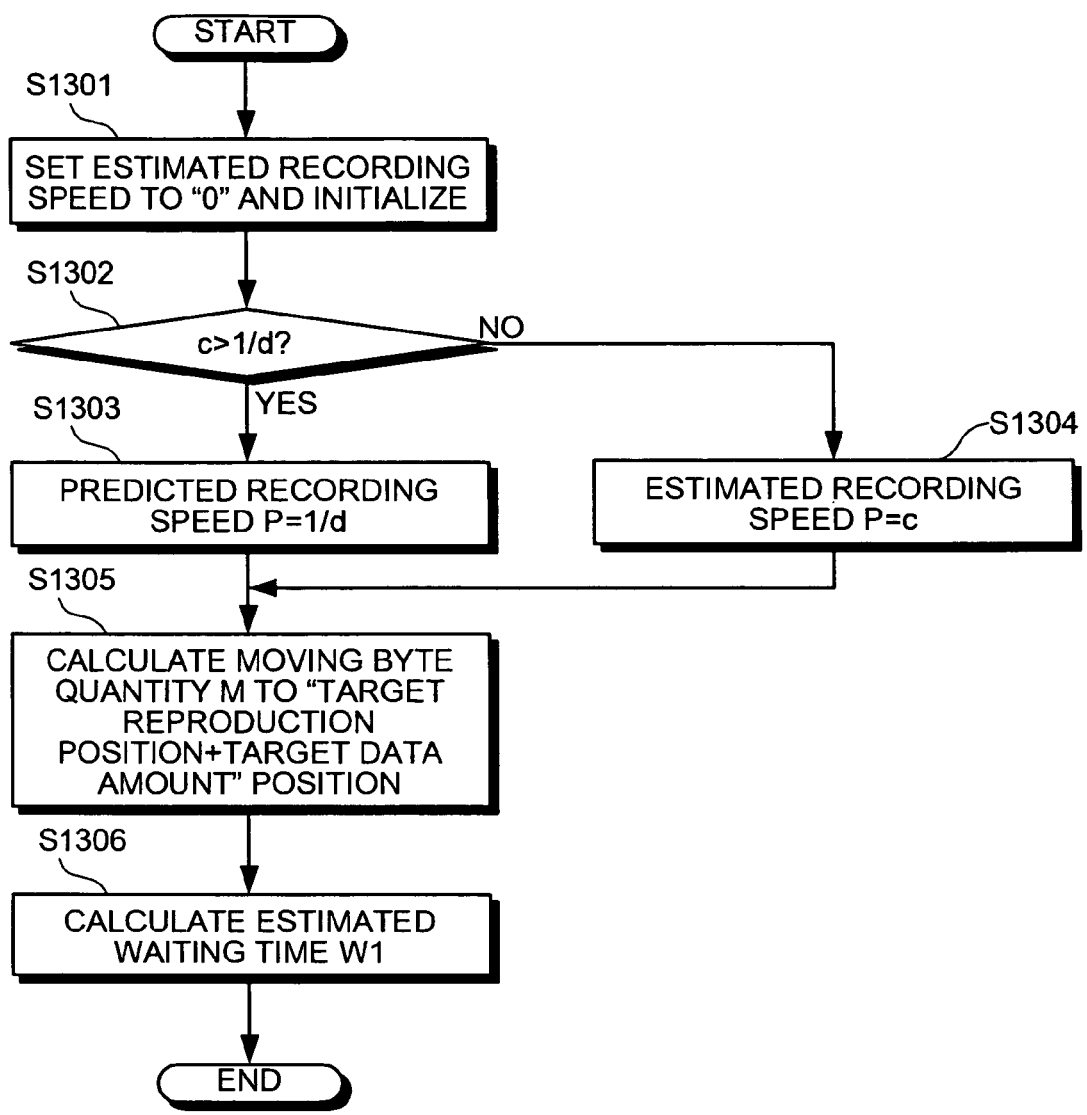
FIG. 13 is a flowchart of an estimated waiting time calculation process shown in FIG. 12.

Next, the estimated waiting time calculation process (step S1202) shown in FIG. 12 will be explained. FIG. 13 is a flowchart of the estimated waiting time calculation process (step S1202) shown in FIG. 12. First, a value of the estimated recording speed is set to "0" and initialized (step S1301). Next, value of the average recording instruction byte quantity c acquired at step S1202 and an inverse number of the average recording time d are compared (step S1302). The comparison process (step S1302) is equivalent to the process of the comparing unit 241 shown in FIG. 9.

When the average recording instruction byte quantity c is larger (step S1302: YES), this indicates that the recording speed of the recording processing unit 311 is not fast enough for a desired speed. Therefore, the inverse number of the average recording time d is decided as an estimated recording speed P (step S1303). The inverse number of the average recording time d is an actual recording speed. At the same time, when the inverse number of the average recording time d is larger (step S1302: NO), a speed in which the recording instruction is given sufficiently faster than the recording speed. Therefore, the average recording instruction byte quantity c is decided as the estimated recording speed P (step S1304). The reproduction system 350 deems the content 203 data to be generated by the recording system 300 at the estimated recording speed P. The reproduction system 350 calculates an estimated waiting time W1 of until a current byte quantity to be processed is obtained.

Subsequently, a moving byte quantity M from the end recording position to the "target reproduction position+target data amount" position is calculated (step S1305). The end recording position is the current recording position. Specifically, the moving byte quantity M is calculated from a difference between the byte quantity of the end recording position and the byte quantity of the "target reproduction position+target data amount" position. Then, the estimated waiting time W1 is calculated (step S1306). The estimated waiting time W1 can be calculated by a following equation (1).

$$\text{estimated waiting time } W1 = \text{moving byte quantity } M/\text{estimated recording speed } P \quad (1)$$

The processes at step S1303 to step S1306 are equivalent to the processes of the calculation processing unit 242 shown in FIG. 9.

According to the estimated waiting time calculation process (step S1202), an amount of waiting time required to obtain a targeted reproduction end position and byte quantity can be predicted from the recording speed of the recording system 300.

Figure 14:
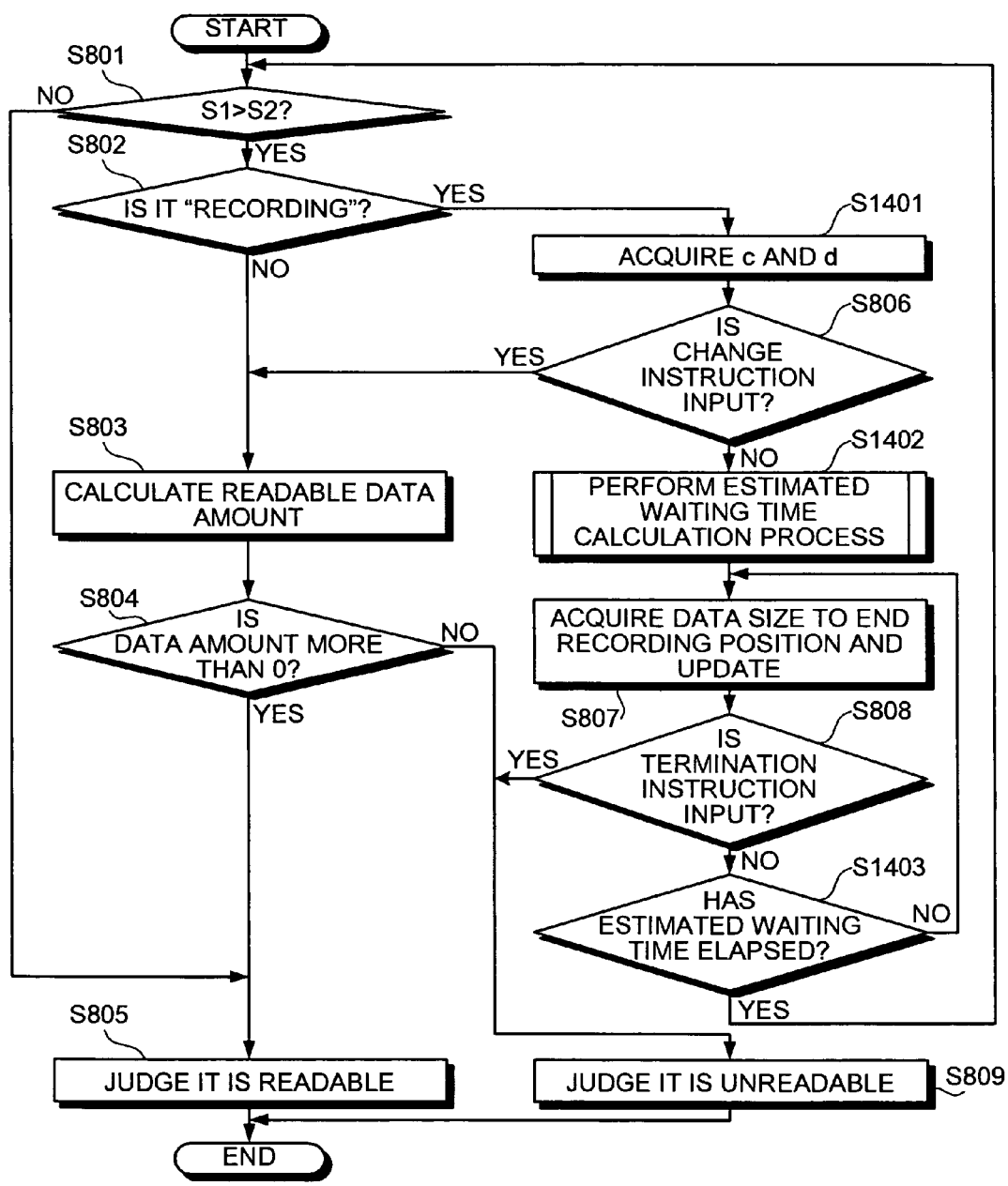
FIG. 14 is a flowchart of a data readability judging process according to the second example.

Next, the data readability judging process (step 608) shown in FIG. 6 when the simultaneous access flag of the area B is "OFF" in the second example will be explained. FIG. 14 is a flowchart of the data readability judging process (step 608), shown in FIG. 6. In the flowchart, a process at step S1401 is performed between step S802: YES and step S806. A process at step S1402 is performed between step S806: NO and step S807. A process at step S1403 is performed between step S808: NO and step S801. Explanations of steps having the same step number as those in FIG. 8 are omitted.

First, when the area A is judged to be "recording" at step S802 (step S802: YES), the current average recording instruction byte quantity c per unit time (for example, one second) is acquired from the area C and the current average recording time d required for recording one byte of data is acquired from the area D in the recording medium 330 (step S1401).

Then, when the changing instruction is not input at step S806 (step S806: NO), the estimated waiting time calculation process is performed (step S1402). The estimated waiting time calculation process is equivalent to the calculation process of the estimated waiting time calculating unit 240 shown in FIG. 9. Then, after step S808: NO, whether the estimated waiting time has elapsed is detected (step S1403). When the elapse of the estimated waiting time is not detected (step S1403: NO), the process returns to step S807. At the same time, when the elapse of the estimated waiting time is detected (step S1403: YES), the process returns to step S801. The estimated waiting time detection process (step S1403) is equivalent to the detection process of the detecting unit 224 shown in FIG. 9.

Figure 15:
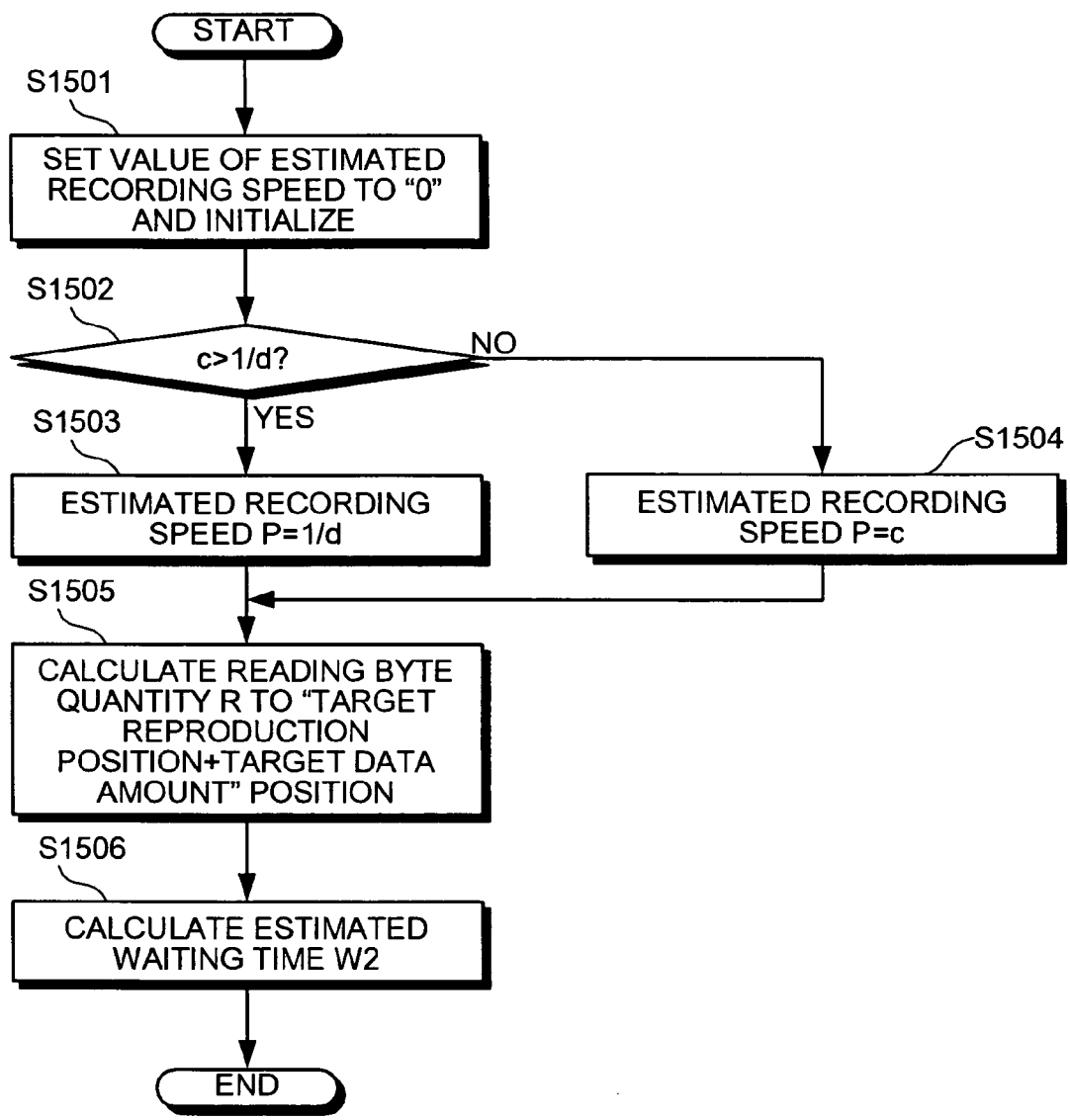
FIG. 15 is a flowchart of an estimated waiting time calculation process shown in FIG. 14.

Next, the estimated waiting time calculation process (step S1402) shown in FIG. 14 will be explained. FIG. 15 is a flowchart of the estimated waiting time calculation process (step S1402) shown in FIG. 14. First, the value of the estimated recording speed is set to "0" and initialized (step S1501). Next, the value of the average recording instruction byte quantity c acquired at step S1401 and the inverse number of the average recording time d is compared (step S1502). The comparison process (step S1502) is equivalent to the process of the comparing unit 241 shown in FIG. 9.

When the average recoding instruction byte quantity c is larger (step S1502: YES), the average recording time d is decided as the estimated recording speed P (step S1503). At the same time, when the inverse number of the average recording time d is larger (step S1502: NO), the average recording instruction byte quantity c is decided as the estimated recording speed P (step S1504).

Subsequently, a reading byte quantity R from the end recording position to the "target reproduction position+target data amount" position is calculated (step S1505). The end recording position is the current recording position. Specifically, the reading byte quantity R is calculated from a difference between the byte quantity of the end recording position and the byte quantity of the "target reproduction position+target data amount" position. Then, an estimated waiting time W2 is calculated (step S1506). The estimated waiting time W2 can be calculated by a following equation (2).

estimated waiting time $W2$=reading byte quantity $R$/estimated recording speed $P$ (2)

The processes at step S1503 to step S1506 are equivalent to the processes of the calculation processing unit 242 shown in FIG. 9.

Figure 16:
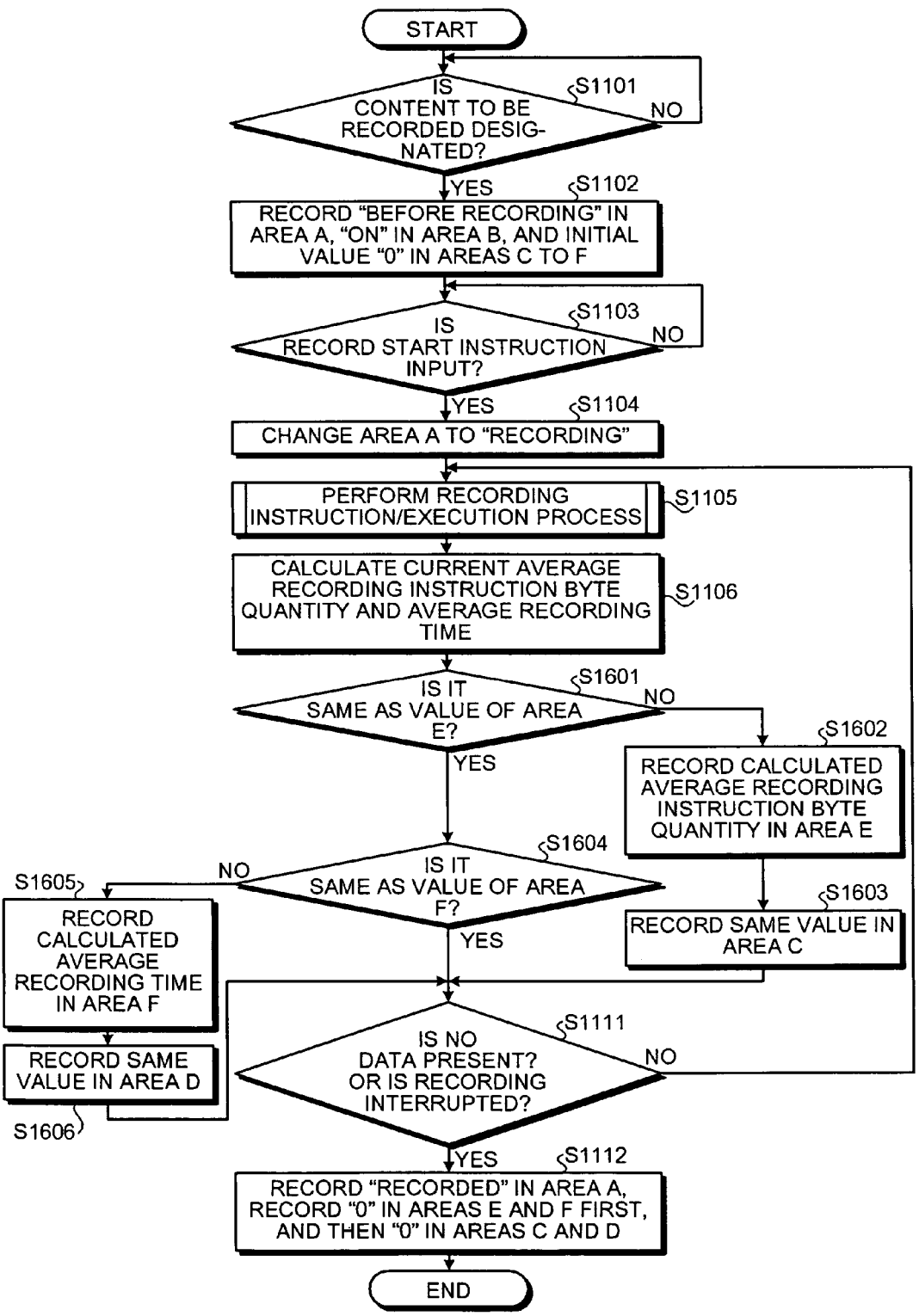
FIG. 16 is a flowchart of the recording process by the recording system of the recording and reproduction system when the simultaneous access control flag of the area B is "ON" in the second example.

Next, the recording process of the recording system of the recording and reproduction system in the second example, when the simultaneous access flag of the area B is "ON", will be explained. FIG. 16 is a flowchart of the recording process of the recording system 300 of the recording and reproduction system 200 in the second example, when the simultaneous access flag of the area B is "ON". In the flowchart shown in FIG. 16, step S1107 to step S1110 in the flowchart shown in FIG. 11 are replaced with step S1601 to step S1606, described hereafter. A step that is the same as that in FIG. 11 is given the same step number, and an explanation thereof is omitted.

After step S1106, the value recorded in area E and a calculated average recording instruction byte quantity e are compared to determine whether the values are the same (step S1601). When the values are not the same (step S1601: NO), the calculated recording instruction byte quantity e is recorded in the area E (step S1602), and a same value c is recorded in the area C (step S1603).

At the same time, when the values are the same (step S1601: YES), the value recorded in the area F and a calculated average recording time f are compared to determine whether the values are the same (step S1604). When the values are not the same (step S1604: NO), the calculated average recording time f is recorded in the area F (step S1605), and a same value d is recorded in the area D (step S1606). Subsequently, the process proceeds to step S1111. At the same time, when the value recorded in the area F and the calculated average recording time f are the same values (step S1604: YES), the process proceeds to step S1111.

Figure 17:
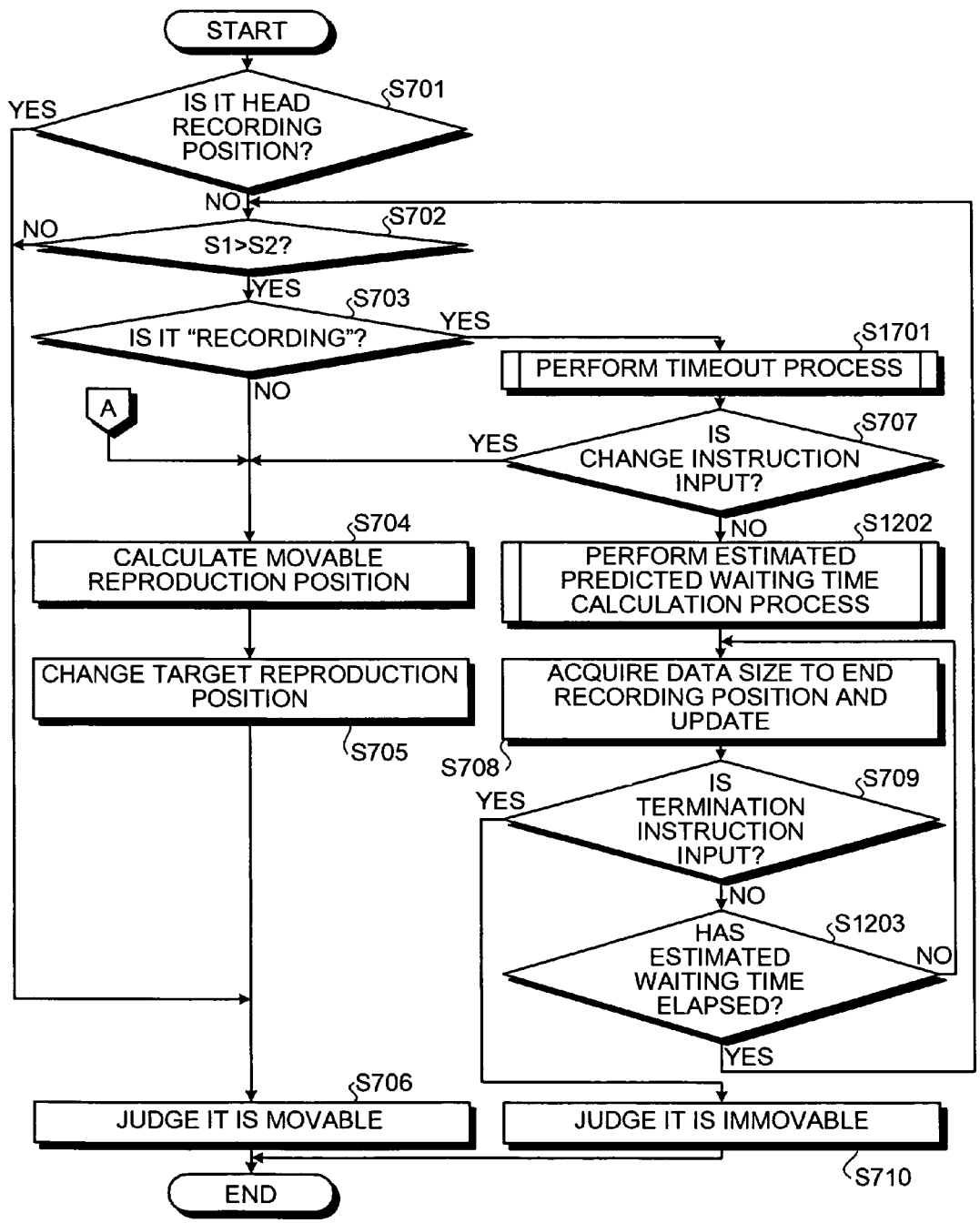
FIG. 17 is a flowchart of another movability judging process according to the second example.

Next, the movability judging process (step S606) of the "target reproduction position+target data amount" position in the second example, when the simultaneous access flag of the area B is "ON" will be explained. FIG. 17 is a flowchart of the movability judging process (step S606) shown in FIG. 6. In the flowchart, step S1201 in the flowchart shown in FIG. 12 is replaced with step S1701, described hereafter. A step that is the same as that in FIG. 12 is given the same step number, and an explanation thereof is omitted.

In FIG. 17, after step S703, a timeout process is performed (step S1701). In the timeout process (step S1701), when access control is performed (the area B is "ON"), the reproduction system 300 compares the values recorded in the temporary areas (area E and area F) and the values recorded in the main areas (area C and area D) to determine whether the values are the same, thereby determining whether the management data recorded by the reproduction system 350 has been properly read.

Ordinarily, the comparison of the values is successful. However, if the recording speed of the recording system 300 is excessively fast or a recording frequency is excessively high, a state in which the recording system 300 is constantly recording can be considered. In this case, the values recorded in the temporary areas (area E and area F) and the values recorded in the main areas (area C and area D) may not match regardless of how many times the reproduction system 350 performs the reading. The timeout process (step S1701) anticipates a state such as the above. Details of the timeout process (step S1701) will be explained in detail.

Figure 18:
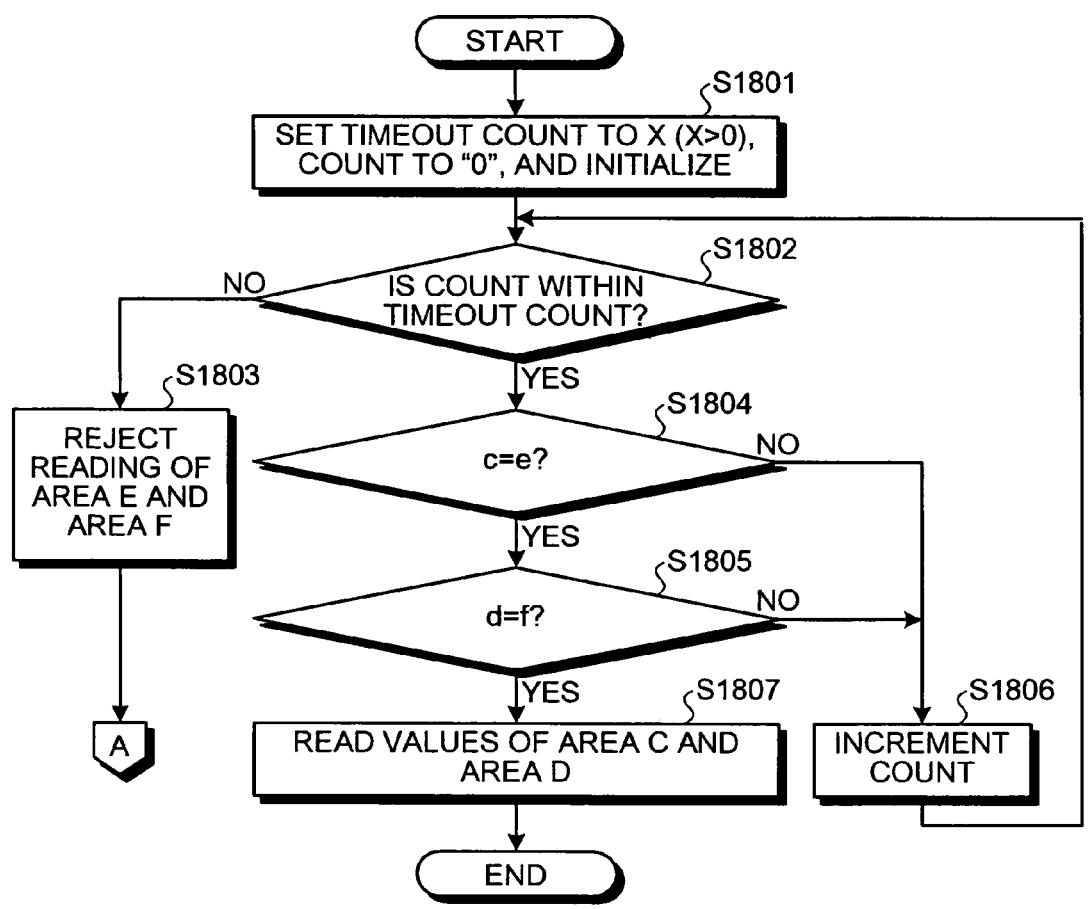
FIG. 18 is a flowchart of processing details of a timeout process shown in FIG. 17.

FIG. 18 is a flowchart of details of the timeout process (step S1701) shown in FIG. 17. First, a timeout count is set to X(X>0) and initialized. A count T is set to "0" and initialized (step S1801). When the count T is not within the timeout count X (step S1802: NO), the reading of the value e of the area E and the value f of the area F is rejected (step S1803). Then, the process proceeds to step S704.

At the same time, when the count T is within the timeout count X (step S1802: YES), the value c of the area C and the value e of the area E are compared to determine whether the values are the same (step S1804). When the values are not the same (step S1804: NO), the count T is incremented (step S1806), and the process returns to step S1802.

At the same time, when the values are the same (step S1804: YES), the value d of the area D and the value f of the area F are compared to determine whether the values are the same (step S1805). When the values are not the same (step S1805: NO), the count T is incremented (step S1806), and the process returns to step S1802. At the same time, when the values are the same (step S1805: YES), the value c of the area C and the value d of the area D are read (step S1807)

Therefore, when contents do not match regardless of the comparison being performed for the number of times (timeout count X) set by the reproduction system 350, the recording speed information c and d of the main areas (area C and area D) are not used. In cases such as this, processes dependent on the recording speed cannot be performed. As a result, the process is switched to a method that reads only an amount of data that can currently be read. By an implementation of the timeout process, the reproduction system 350 can perform a more stable control without being influenced by the behavior of the recording system 300.

Figure 19:
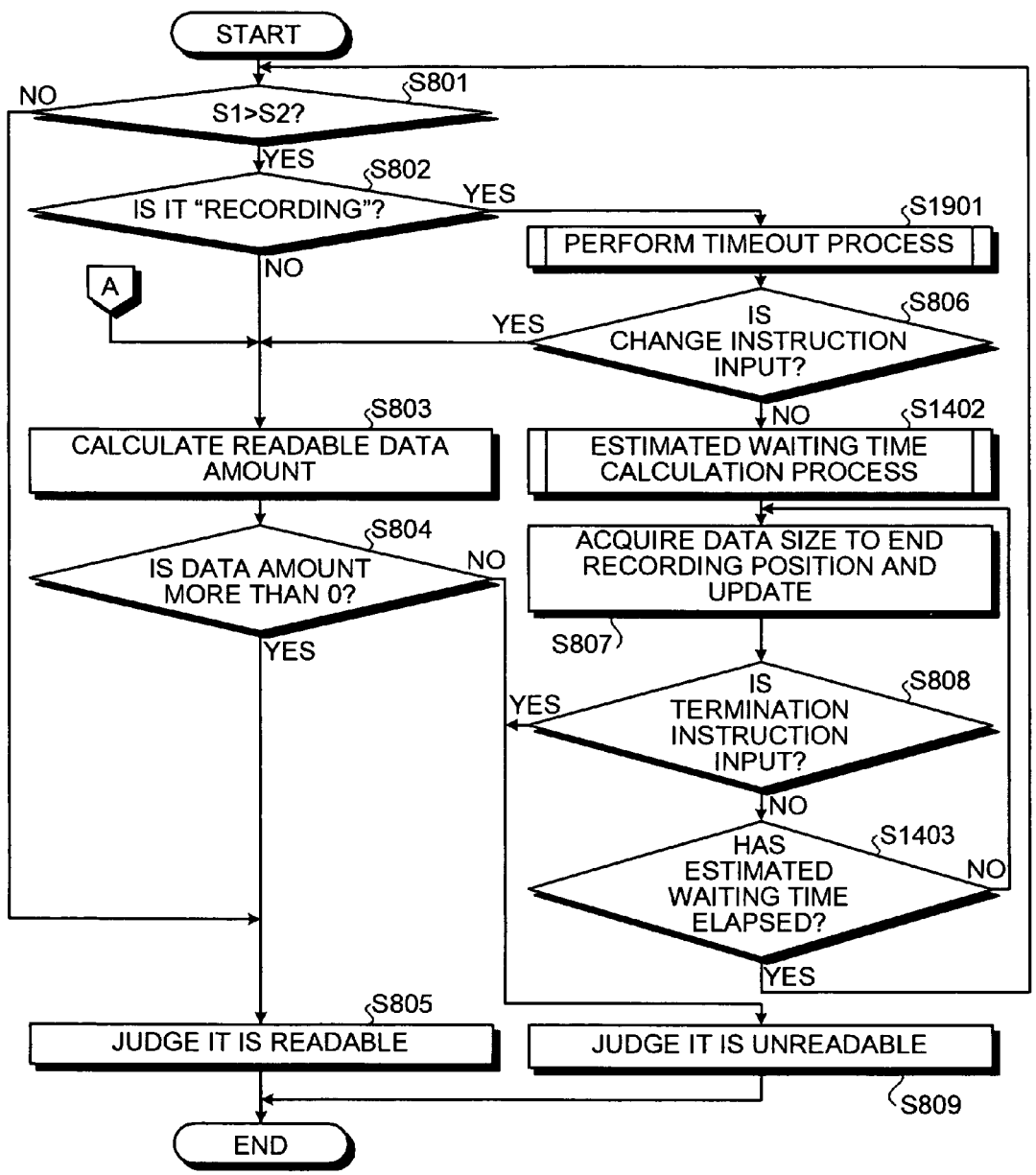
FIG. 19 is a flowchart of another data readability judging process according to the second example.

Next, the readability judging process (step S608) when the simultaneous access flag of the area B is "ON" in the second example will be explained. FIG. 19 is a flowchart of the readability judging process (step S608) shown in FIG. 6. In the flowchart, step S1401 in the flowchart shown in FIG. 14 is replaced with step S1901, described hereafter. A step that is the same as that in FIG. 14 is given the same step number, and an explanation thereof is omitted.

In FIG. 19, after step S802: YES, the time out process is performed (step S1901). The timeout process (step S1901) is the same as the process (step S1801 to step S1807) shown in FIG. 18, and an explanation thereof is omitted. After step S1803, the process proceeds to step S803. Therefore, as described above, the reproduction system 350 can perform a more stable control without being influenced by the behavior of the recording system 300, in the readability judging process, as well.

As explained above, according to the first and second examples, information can be provided in detail to the reproduction system application 351. Specifically, the waiting time required when the reproduction system cannot perform a desired operation can be predicted by an expansion of the information related to the recording speed.

In addition, the recording system 300 records the recording speed (waiting time) in the recording medium 330 to allow the reproduction system 350 to acquire the recording speed. Therefore, options taken by the reproduction system application 351 are increased when the reproduction system 350 cannot move to the reproduction end position or when the reproduction system 350 cannot read the data. In particular, in the first and second examples, indicators can be denoted by numerical values. The indicators indicate the number of seconds the reproduction system 350 is required to wait to acquire data or the number of seconds the reproduction system 350 is required to wait until the reproduction system 350 can be moved As a result, for example, when the reproduction system 350 cannot read the data or cannot move to the reproduction end position while fast-forwarding, the reproduction system application 351 can judge that continuation of the fast-forwarding operation is difficult, reduce the reproduction speed to a normal speed, and continue reproduction.

When the reproduction system 350 wishes to move the current reproduction end position to a reproduction end position to which the current reproduction end position cannot be moved in the current state, if the information acquired from the management data indicates that the current reproduction end position can be moved to the desired reproduction end position after the reproduction system 350 waits for one second, a method can be selected, in which an attempt to move the current reproduction end position is made again after waiting for one second.

Still another method anticipates a situation in which a reading buffer of the reproduction system 350 is extremely large, or when all content 203 data currently being recorded is read immediately after reproduction is started. When the reproduction is started, the reproduction system 350 can continue reproducing for a brief period. However, generally, the reproduction system 350 holds a large amount of read data within the buffer. Therefore, the reproduction system 350 preferably reads readable data as much in advance as possible. In a state as such, it can be predicted from the recording speed information of the management data that 100 bytes will be generated after an elapse of one more second. Therefore, a process can be performed in which an attempt to read the data is made again after one second and all readable data is read.

From the above, in the recording and reproduction system, the recording and reproduction method, and the recording and reproduction program, the recording device 201 discloses the status information 204 to the reproduction device 202. Therefore, the reproduction device 202 can immediately judge the status merely by reading the management information and actualize a reproduction operation depending on the status.

According to an aspect of the embodiment, the recording and reproduction method can be actualized by a computer, such as a personal computer and a work station, executing a program provided in advance. The program is recorded on a computer-readable recording medium, such as a hard disk, a flexible disk, a CD-ROM, an MO disk, a DVD, etc. The program is read out from the recording medium by the computer and executed. The program can also be a transmission medium that can be distributed via a network, such as the Internet.

According to another aspect of the embodiment, the recording and reproduction system 200 can be applied to, for example, a CD player, an MD player, an MD recorder, a DVD player, a DVD recorder, a player using compressed data such as MP3 and WMA, a car navigation device, and the like. In addition, the recording and reproduction system can be used, for example, as audio-visual equipment (home-use, business-use, on-board, or portable). Still further, the recording and reproduction system 200 can be applied to network-type audio visual distribution and reception equipment (server/client system), a real-time analysis result outputting device, a TTS (text-to-speech) speech synthesis device, an automatic translation and interpretation device, a componential analysis result presentation device, and the like.

The invention claimed is:

1. A recording and reproduction system comprising:
   a recording device including
      a recording unit configured to record data including image data and audio data; and
      a generating unit configured to generate information on a recording process by the recording unit; and
   a reproduction device including
      a reproducing unit configured to reproduce the data; and
      a control unit configured to control the reproducing unit, when the data is currently being recorded by the recording unit, to reproduce the data based on the information, and includes
         a receiving unit configured to receive designation of a starting position for reproducing the data;
         a position judging unit configured to judge whether the starting position for reproducing the data is within a recording segment from a head recording position to an end recording position of the data, the recording segment being recorded by the recording unit;
         a status judging unit configured to judge whether the data is currently being recorded by the recording unit based on the information when the position judging unit judges that the starting position for reproducing the data is not within the recording segment; and
         a detecting unit configured to detect, when the status judging unit judges that the data is currently being recorded, whether the end recording position has passed ahead of the starting position for reproducing the data while the end recording position moves ahead as the recording process of the data proceeds, wherein the reproducing unit is configured to reproduce the data being recorded, from the starting position for reproducing the data, based on a result of detection by the detecting unit.

2. The recording and reproduction system according to claim 1, wherein the control unit further includes a change receiving unit configured to receive an instruction for changing the starting position for reproducing the data;

a determining unit configured to determine whether to change the starting position for reproducing the data based on the instruction, when the position judging unit judges that the starting position for reproducing the data is not within the recording segment; and a changing unit configured to change the starting position for reproducing the data to a position within the recording segment, when the determining unit determines to change the starting position for reproducing the data, and the reproducing unit is configured to reproduce the data currently being recorded, from the position to which the starting position for reproducing the data is changed by the changing unit.

3. The recording and reproduction system according to claim 2, wherein the detecting unit is configured to detect, when the determining unit determines not to change the starting position for reproducing the data, whether the end recording position has passed ahead of the starting position while the end recording position moves as the recording of the data proceeds.

4. The recording and reproduction system according to claim 2, wherein the recording device further includes a recording-speed calculating unit configured to calculate recording speed information indicative of speed of recording the data currently being recorded, the control unit further includes an estimating unit configured to estimate waiting time required for the end recording position to reach the starting position for reproducing the data, based on the end recording position, the starting position for reproducing the data, and the recording speed information, when the position judging unit judges that the starting position for reproducing the data is not within the recording segment, and the detecting unit is configured to detect whether the waiting time has elapsed.

5. The recording and reproduction system according to claim 4, wherein the recording speed information includes an instructed recording amount per unit time for the data currently being recorded and a recording time per unit recording amount actually required for the data currently being recorded, and the estimating unit includes an estimated speed calculating unit configured to calculate estimated recording speed based on the instructed recording amount and the recording time, the estimating unit configured to estimate the waiting time based on the end recording position, the starting position for reproducing the data, and the estimated recording speed, when the position judging unit judges that the starting position for reproducing the data is not within the recording segment.

6. The recording and reproduction system according to claim 4, wherein the detecting unit is configured to detect, when the determining unit determines not to change the starting position for reproducing the data, whether the waiting time has elapsed.

7. The recording and reproduction system according to claim 1, wherein the recording device further includes a recording-speed calculating unit configured to calculate recording speed information indicative of speed of recording the data currently being recorded at predetermined time intervals;

a memory unit configured to store the recording speed information in a first memory area and a second memory area that is different from the first memory area;

a first updating unit configured to update, every time the recording-speed calculating unit calculates the recording speed information, recording speed information stored in the first memory area to recording speed information newly calculated by the recording-speed calculating unit; and a second updating unit configured to update, every time the first updating unit updates the recording speed information, recording speed information stored in the second memory area to the recording speed information updated by the first updating unit, the control unit further includes an estimating unit configured to estimate waiting time required for the end recording position to reach the starting position for reproducing the data, based on the end recording position, the starting position for reproducing the data, and the recording speed information updated by the second updating unit, when the position judging unit judges that the starting position for reproducing the data is not within the recording segment, and the detecting unit is configured to detect whether the waiting time has elapsed.

8. The recording and reproduction system according to claim 7, wherein the estimating unit is configured to estimate the waiting time based on the recording speed information updated by the first updating unit and the second updating unit, when the position judging unit judges that the starting position for reproducing the data is not within the recording segment.

9. The recording and reproduction system according to claim 7, wherein the recording speed information includes an instructed recording amount per unit time for the data currently being recorded and a recording time per unit recording amount actually required for the data currently being recorded, and the estimating unit includes an estimated speed calculating unit configured to calculate estimated recording speed based on the instructed recording amount and the recording time, the estimating unit configured to estimate the waiting time based on the end recording position, the starting position for reproducing the data, and the estimated recording speed, when the position judging unit judges that the starting position for reproducing the data is not within the recording segment.

10. A recording and reproduction system comprising:
a recording device configured to record data including image data and audio data, and including
a receiving unit configured to receive, while the recording device is recording the data, designation of a starting position for reproducing the data;
a position judging unit configured to judge whether the starting position for reproducing the data is within a recording segment from a head recording position to an end recording position of the data, the recording segment being recorded by a recording unit;
a detecting unit configured to detect, when the position judging unit judges that the starting position for reproducing the data is not within the recording segment, whether the end recording position has passed ahead of the starting position for reproducing the data while the end recording position moves ahead as the recording process of the data proceeds; and
a reproducing unit configured to reproduce the data based on a result of detection by the detecting unit; and
a reproduction device configured to reproduce the data.

11. A recording and reproduction method of reproducing data including image data and audio data while the data is being recorded, the recording and reproduction method comprising:
inputting a starting position for reproducing the data for the data being recorded;
judging whether the starting position for reproducing the data is within a recording segment from a head recording position to an end recording position of the data, the recording segment being recorded in a recording unit;
detecting whether the end recording position has passed ahead of the starting position for reproducing the data while the end recording position moves ahead as the recording process of the data proceeds, when it is judged that the starting position for reproducing the data is not within the recording segment at the judging; and
reproducing the data from the starting position for reproducing the data when it is detected that the end recording position has passed ahead of the starting position for reproducing the data at the detecting.

12. A recording and reproduction method comprising:
generating information indicative of a recording status of data including image data and audio data;
inputting a starting position for reproducing the data;
judging whether the starting position for reproducing the data is within a recording segment from a head recording position to an end recording position of the data, the recording segment being recorded in a recording unit;
determining whether the data is being recorded based on the information when it is judged that the starting position for reproducing the data is not within the recording segment at the judging;
detecting whether the end recording position has passed ahead of the starting position for reproducing the data while the end recording position moves ahead as the recording process of the data proceeds, when it is determined that the data is being recorded at the determining, and
reproducing the data currently being recorded, from the starting position for reproducing the data, based on a result of detection at the detecting.

* * * * *